United States Patent
Kim et al.

(10) Patent No.: US 9,325,983 B2
(45) Date of Patent: Apr. 26, 2016

(54) IMAGE PROCESSING APPARATUS AND METHOD USING TRACKING OF GAZE OF USER

(75) Inventors: Yun Tae Kim, Hwaseong-si (KR); Gee Young Sung, Suseong-gu (KR); Dong Kyung Nam, Yongin-si (KR); Ju Yong Park, Gwanak-gu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 920 days.

(21) Appl. No.: 13/067,416

(22) Filed: May 31, 2011

(65) Prior Publication Data

US 2012/0056872 A1 Mar. 8, 2012

(30) Foreign Application Priority Data

Sep. 7, 2010 (KR) .................. 10-2010-0087549

(51) Int. Cl.
H04N 7/18 (2006.01)
H04N 13/04 (2006.01)

(52) U.S. Cl.
CPC ....... *H04N 13/0477* (2013.01); *H04N 13/0402* (2013.01)

(58) Field of Classification Search
None
See application file for complete search history.

(56) References Cited

U.S. PATENT DOCUMENTS

| | | | | |
|---|---|---|---|---|
| 6,302,541 B1* | 10/2001 | Grossmann | ........... | 351/240 |
| 2011/0193863 A1* | 8/2011 | Gremse et al. | ........... | 345/419 |
| 2011/0310233 A1* | 12/2011 | Bathiche et al. | ........... | 348/51 |

FOREIGN PATENT DOCUMENTS

| | | |
|---|---|---|
| JP | 2005-266591 | 9/2005 |
| JP | 2006-050383 | 2/2006 |
| JP | 2008-146221 | 6/2008 |
| JP | 2008-155720 | 7/2008 |
| JP | 2009-250987 | 10/2009 |
| JP | 2009-266086 | 11/2009 |
| JP | 2009-287936 | 12/2009 |
| JP | 2010-056712 | 3/2010 |
| KR | 10-2008-0010041 A | 1/2008 |

OTHER PUBLICATIONS

Boev, Atanas, et al. "Optimized single-viewer mode of multiview autostereoscopic display." EURASIP, Aug. 25-29, 2008.*
Boev, Atanas, et al. "Opengl-Based Control of Semi-Active 3D Display." 3DTV Conference: The True Vision-Capture, Transmission and Display of 3D Video, 2008. IEEE, 2008.*
Korean Office Action issued by the Korean Patent Office on Feb. 1, 2016 for the corresponding KR Patent Application No. 10-2010-0087549. 3 pages in English 5 pages Korean.

* cited by examiner

*Primary Examiner* — Tize Ma
*Assistant Examiner* — Yu Chen
(74) *Attorney, Agent, or Firm* — NSIP Law

(57) ABSTRACT

An apparatus and method for outputting view images by tracking a gaze of a user are provided. The image processing apparatus estimates movement of a gaze of a user using a camera, and determines an output order of view images according to the gaze movement.

18 Claims, 22 Drawing Sheets

IMAGE PROCESSING APPARATUS AND METHOD USING TRACKING OF GAZE OF USER

CROSS-REFERENCE TO RELATED APPLICATIONS

This application claims the benefit of Korean Patent Application No. 10-2010-0087549, filed on Sep. 7, 2010, in the Korean Intellectual Property Office, the disclosure of which is incorporated herein by reference.

BACKGROUND

1. Field

Example embodiments of the present disclosure relate to an image processing apparatus and method capable of outputting view images by tracking a gaze of a user.

2. Description of the Related Art

To effectively implement a stereoscopic effect of a 3-dimensional (3D) image, images from different viewpoints should be supplied to each of the left and right eyes of a person. To achieve the 3D effect without a filter such as dedicated glasses, a 3D image needs to be expressed in a state of being separated spatially based on viewpoints, which is called an autostereoscopic display. In an autostereoscopic display, an image is displayed in a space in a state of being separated by an optical device such as an optical lens, a barrier, and the like. When using the optical lens, the autostereoscopic display uses a lenticular lens so that pixel images are expressed only in a specific direction. When using the optical barrier, only a specific pixel can be seen in a specific direction since a slit is placed in front of the autostereoscopic display. As described above, the autostereoscopic display using the optical lens or optical barrier expresses images from two viewpoints, that is, a right viewpoint and a left viewpoint, and a sweet spot having a significantly narrow stereoscopic viewing angle is generated. The sweet spot is expressed by a viewing distance and a viewing angle. The viewing distance is determined by a pitch of a lens or a slit. The viewing angle is determined by the number of expressed viewpoints. When the viewing angle is widened by increasing the number of viewpoints, an autostereoscopic multi-view display is achieved.

A wide viewing area may be achieved by the autostereoscopic multi-view display. However, since 3D resolution is proportional to the number of viewpoints, the autostereoscopic multi-view display reduces resolution of the displayed image.

Accordingly, there is a demand for a method capable of providing a wide viewing area by increasing the number of viewpoints while minimizing reduction in the resolution caused by the increased number of viewpoints.

SUMMARY

According to one or more example embodiments of the present disclosure, an image processing apparatus may be provided, which includes a movement estimation unit to estimate a movement of a gaze of a user, and an output order determining unit to determine an output order of plurality of view images corresponding to the movement of the gaze of the user.

The movement estimation unit may estimate a movement direction of the gaze of the user. Therefore, the output order determining unit may adjust the output order of the plurality of view images corresponding to a right eye of the user when the gaze of the user is moved to the left.

The output order determining unit may adjust the output order of the plurality of view images corresponding to a left eye of the user when the gaze of the user is moved to the right.

The movement estimation unit may estimate a movement angle of the gaze of the user. Therefore, the output order determining unit may vary the number of the plurality of view images of which the output order is to be adjusted, based on the movement angle.

As the movement angle increases, the output order determining unit may increase the number of the plurality of view images of which the output order is to be adjusted.

The image processing apparatus may further include a display to display an output image comprising a plurality of the view images, according to the determined output order.

The output image may include pixel units each containing at least one view image.

The output order determining unit may determine the output order of the plurality of view images such that a predetermined number of left and right view images are consecutively arranged with respect to a reference view image, the reference view image corresponding to a position to which the gaze of the user is moved.

According to example embodiments, there may be also provided an image processing method including estimating a movement of a gaze of a user; and determining an output order of plurality of view images corresponding to the movement of the gaze of the user.

The estimating of the gaze movement may estimate a movement direction of the gaze of the user, and the determining of the output order may adjust an output order of the plurality of view images corresponding to a right eye of the user when the gaze of the user is moved to the right.

The determining of the output order may adjust an output order of the plurality of view images corresponding to a left eye of the user when the gaze of the user is moved to the left.

The estimating of the gaze movement may estimate a movement angle of the gaze of the user. Therefore, the determining of the output order may vary the number of the plurality of view images of which the output order is to be adjusted, according to the movement angle.

The determining of the output order may increase the number of plurality of view images of which the output order is to be adjusted as the movement angle increases.

The image processing method may further include displaying an output image comprising a plurality of the view images according to the determined output order.

The determining of the output order may determine the output order of the plurality of view images such that a predetermined number of left and right view images are consecutively arranged with respect to a reference view image, the reference view image corresponding to a position to which the gaze of the user is moved.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
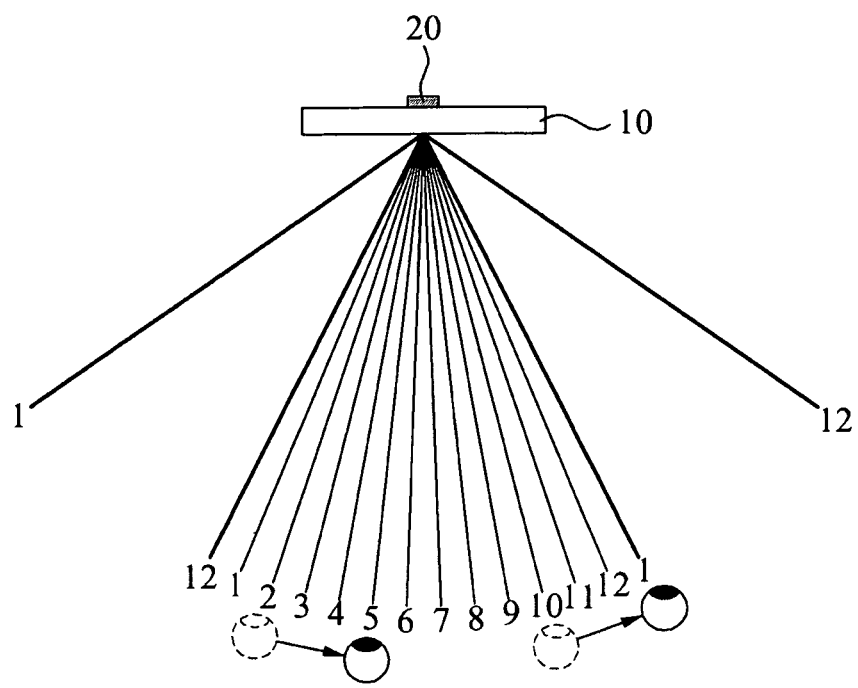
FIG. 1 illustrates a diagram for explaining a case where an inversion phenomenon occurs due to a movement of a gaze of a user.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 illustrates a diagram for describing a case where an inversion phenomenon occurs according to movement of a gaze of a user 30.

When the user moves to the right, a left eye L of the user is disposed in an orthoscopic viewing zone of a display 10 and a right eye R is disposed in a sub-viewing zone of the display 10. Accordingly, a right view image is seen by the left eye L while a left view image is seen by the right eye R, which may make the user 30 feel dizzy.

For example, according to FIG. 1, a sensing device 20 may sense the left eye L of the user gazing at a 2-view image and the right eye R gazing at a 10-view image. When the gaze of the user is moved to the right, the right eye R is disposed in the sub-viewing zone, thereby gazing at a 1-view image. Therefore, the right eye R that has been gazing at the 10-view image which is a right view image comes to gaze at the 1-view image which is a left view image. As a result, an inversion phenomenon occurs to the right eye R. Here, the inversion may be prevented by changing an output order of the view images in such a manner that a 12-view image is displayed in a position where the 1-view image of the user 30 is to be disposed. That is, the inversion may be prevented by performing rendering such that the 12-view image is disposed in the position where the 1-view image is to be disposed.

Hereinafter, a process of determining the output order of view images according to movement of a gaze of a user will be further described with reference to FIG. 2.

Figure 2:
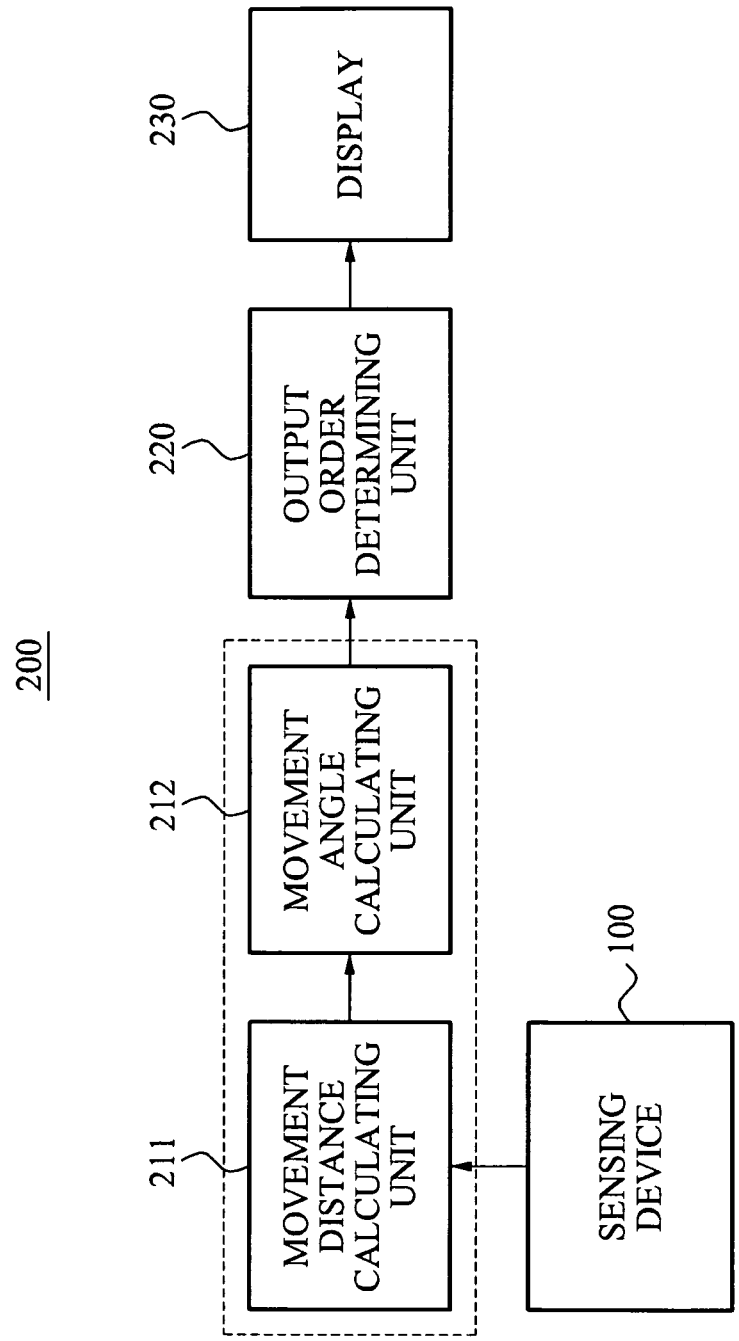
FIG. 2 illustrates a block diagram showing a structure of an image processing apparatus according to example embodiments.

FIG. 2 is a block diagram illustrating a structure of an image processing apparatus 200 according to example embodiments.

Referring to FIG. 2, the image processing apparatus 200 may include, for example, a movement estimation unit 210, an output order determining unit 220, and a display 230.

The movement estimation unit 210 may estimate whether the gaze of the user is moved, based on user eye position information sensed by a sensing device 100. Here, the movement estimation unit 210 may include a movement distance calculating unit 211 and a movement angle calculating unit 212.

For example, the sensing device 100 may photograph the user in real time and transmit a photographed image to the movement distance calculating unit 211 in real time. The sensing device 100 may include any one of a web camera, a monocular camera, a stereo camera, a multi camera, and a camera measuring depth-information. Therefore, the movement distance calculation unit 211 is capable of calculating a position of left or right eyes or both eyes of the user from the photographed image. The user eye position may be expressed by a coordinate value corresponding to view images being displayed on the display 230. In other words, the user eye position may be expressed by a coordinate value of the view images corresponding to positions gazed upon by the eyes of the user. For example, the user eye position calculated from the photographed image may be (x1, y1).

When a next photographed image is received, the movement distance calculating unit 211 may calculate a next position of the left and right eyes of the user from the next photographed image. For example, the next user eye position may be (x2, y2).

In addition, the movement distance calculating unit 211 may determine a direction in which the gaze of the user is moved, that is, a movement direction of the gaze, by calculating a left difference value (x2-x1) between a current left eye position and a next left eye position and a right difference value (y2-y1) between a current right eye position and a next right eye position. Here, when any one of the left difference value and the right difference value is equal to or greater than a preset error value, the movement distance calculating unit 211 may estimate that the gaze is moved. In addition, when the left and the right difference values are positive, the movement distance calculating unit 211 may estimate that the gaze is moved to the right. When the left and right difference values are negative, the movement distance calculating unit 211 may estimate that the gaze is moved to the left.

Figure 3:
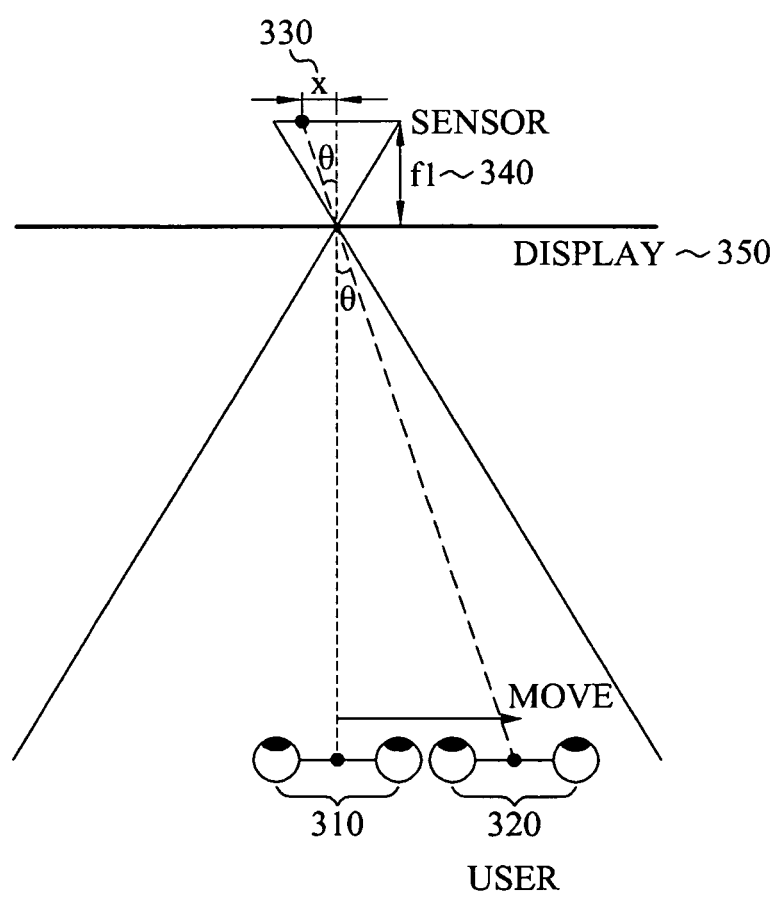
FIG. 3 illustrates a diagram for describing a process of calculating a movement distance.

Referring to FIG. 3, additionally, the movement distance calculating unit 211 may calculate a coordinate value comprised of the left and the right difference values as a movement distance x. For example, the movement distance x may be expressed as a coordinate value (x2-x1, y2-y1).

The movement angle calculating unit 212 may calculate a movement angle of an eye of the user, corresponding to the gaze movement of the user, using the movement distance x and a focal distance fl. Here, a focal distance of the sensing device 100 may be preset as the focal distance fl. The movement angle calculating unit 212 may calculate the movement angle of the eye using Equation 1 below.

$$\theta = \tan^{-1}\left(\frac{x}{fl}\right)$$ [Equation 1]

wherein, θ refers to the movement angle, and fl refers to the focal distance.

Referring to Equation 1, the movement angle calculating unit 212 may calculate the movement angle by dividing the movement distance by the focal distance and calculating an arc tangent value of the quotient. Therefore, the output order determining unit 220 may determine the output order of the view images based on the calculated movement angle.

More specifically, the output order determining unit 220 may determine the output order of the view images corresponding to the movement of the gaze. When the gaze is estimated to have moved, the output order determining unit 220 may vary the number of the view images of which the output order is to be adjusted, in accordance with the calculated movement angle.

Figure 4:
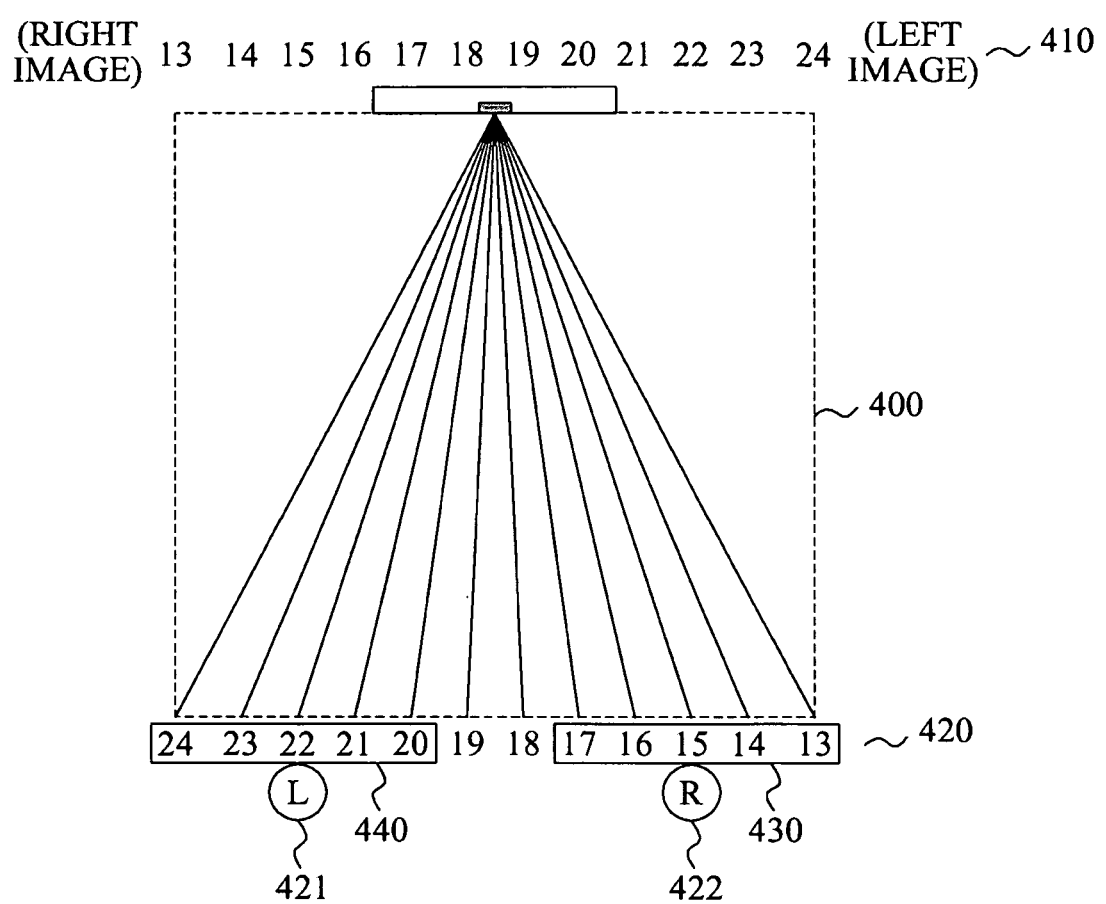
FIG. 4 is a diagram illustrating view images corresponding to a gaze of a user when an input image is a 36-view image and the user is located in a middle of a display.

For example, referring to FIG. 4, when an input image is a 36-view image and when a display being used is capable of displaying 12 view images, the left eye of the user gazes at a 22-view image 421 and the right eye gazes at a 15-view image. Accordingly, a 3D image is seen by the user.

Figure 5:
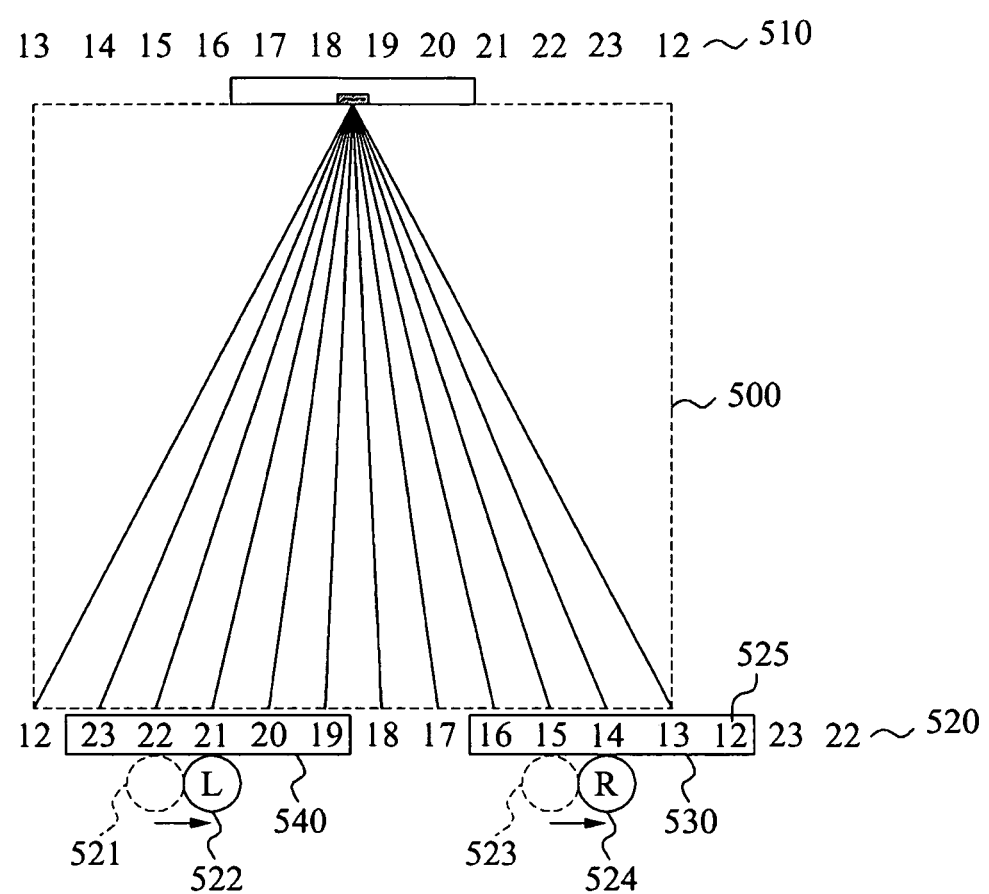
FIGS. 5 through 7 illustrate a process of determining an output order of view images when an input image is a 36-view image and a gaze of a user is moved to the right.

As the gaze of the user moves to the right as shown in FIG. 5, the left eye gazes at a 21-view image 522 and the right eye gazes at a 14-view image 524. Therefore, the movement angle calculating unit 212 estimates that the right eye is moved to the right by about 2θ and, accordingly, the output order determining unit 220 may adjust the output order of the view images corresponding to the right eye, based on the calculated movement angle.

Here, when a lens of the display 400 is tilted by a predetermined angle, view images neighboring on the left and the right may be simultaneously displayed by a single pixel. For example, in a display that displays 12 view images, one pixel may display 5 view images at once. Therefore, as shown in FIG. 5, pluralities of views included in left and right slide windows 530 and 540, respectively, need to be simultaneously displayed to achieve a natural 3D image. To achieve a natural 3D image, the output order determining unit 220 may adjust an output order of the view images as shown in FIG. 5. Therefore, the user gazes at the view images being displayed according to the output order 520 as adjusted by a display 500. For example, even though the gaze of the user is moved to the right by about 1θ, the view images are seen by the right eye in order of 16, 15, 14, 13, and 12-view images. Thus, when the output order of the view images is adjusted according to the movement of the gaze, a 12-view image 525, instead of a 24-view image, is continued next to the 13-view image, thereby preventing the inversion.

Figure 6:
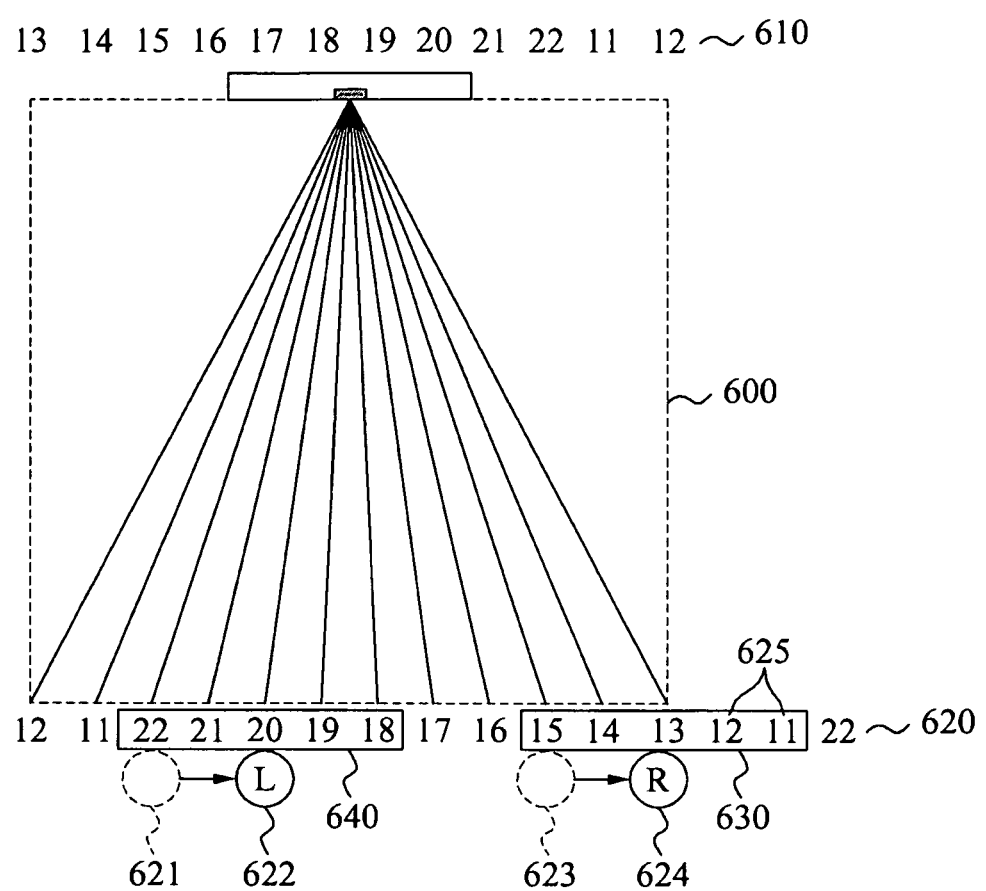

In a similar manner, as shown in FIG. 6, when the gaze of the user is moved to the right by about 2θ, the left eye gazing at a 22-view image 621 may be moved to a position for gazing at a 20-view image 622, and the right eye gazing at a 15-view image 623 may be moved to a position for gazing at a 13-view image 624. Here, the output order determining unit 220 may determine the output order of the view images such that view images continued to the left and the right of a view image corresponding to the position to which the gaze is moved are naturally continued. That is, as the right eye of the user is moved to the right by about 2θ, the output order determining unit 220 may determine the output order such that the view images are seen by the right eye in order of 15, 14, 13, 12, and 11-view images instead of in order of 15, 14, 13, 24, and 23-view images. Therefore, the view images 12 and 11 625 are continued instead of the view images 24 and 23 next to the 13-view image 624. As a result, the user is able to see a natural 3D image.

Figure 7:
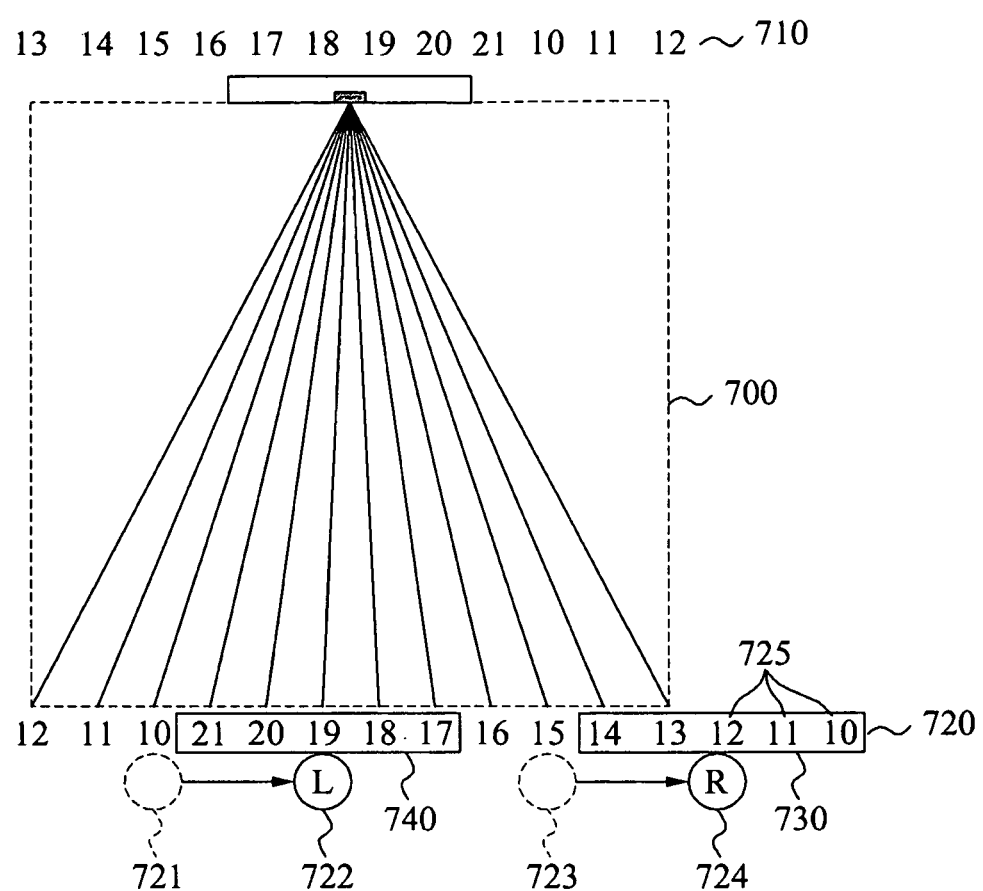

In the same manner, referring to FIGS. 4 and 7, when the gaze of the user is moved to the right by about 3θ, the left eye gazing at a 22-view image 421, as illustrated in FIG. 4, may be moved to a position for gazing at a 19-view image 722, as illustrated in FIG. 7, and the right eye gazing at a 15-view image 723 may be moved to a position for gazing at a 12-view image 724 as illustrated in FIG. 7. Here, the output order determining unit 220 may determine the output order of the view images constituting an output image such that pluralities of the view images included in the left and the right slide windows 730 and 740 are naturally continued along the movement of the gaze. For example, the output order determining unit 220 may determine to output the view images in order of 13, 14, 16, 17, 18, 19, 20, 21, 10, 11, and 12-view images 710. Accordingly, 12, 11, and 10-view images 725 instead of the view images 24, 23 and 22 may be consecutively seen by the right eye after the 13-view image.

As described above, as the movement angle increases from θ to 2θ and 3θ, the number of the view images of which the output order is to be adjusted may be increased from 1 to 2 and from 2 to 3, respectively.

In the above, the process of determining the output order of the view images corresponding to the movement of the gaze when the gaze is moved to the right has been described with reference to FIGS. 4 through 7. In FIGS. 5 through 7, the output order determining unit 220 may achieve a natural 3D image by determining the output order such that the view images that can be simultaneously displayed in one pixel are consecutively arranged. In other words, the output order maybe determined such that a plurality of the view images of the left slide window are consecutive left view images and a plurality of the view images of the right slide window are consecutive right view images.

Here, among the plurality of view images, the view image corresponding to the position of the gaze may be disposed in the middle of the slide window. The same number of view images is arranged on the left and the right of the view image disposed in the middle of the slide window. Referring to FIG. 7, for example, as the gaze is moved to the right by about 3θ, the 12-view image 724 corresponding to the gaze is disposed in the middle of the slide window while a preset reference number of view images are continued to the left and to the right of the 12-view image 724, respectively. When the reference number is set to 2, the 14 and 13-view images may be continued to the left of the 12-view image 724 and the 11 and 10-view images may be continued to the right of the 12-view image 724. The reference number may be preset as a value obtained by dividing the number of view images simultaneously displayed in one pixel by 2.

As described above, the output order determining unit 220 may determine the output order of the plurality of view images constituting the output image based on the movement angle calculated as the gaze of the user is moved. Accordingly, the display 230 may display the plurality of view images according to the determined order. Here, the output order determining unit 220 may determine the output order using a database where the output orders according to the movement angles are stored.

Table 1 shows the output orders corresponding to the movement angles calculated as the gaze of the user is moved to the right. The input image in Table 1 is a 36-view image.

TABLE 1

| Movement angle | Output orders of view images | | | | | | | | | | | |
|---|---|---|---|---|---|---|---|---|---|---|---|---|
| (θ) | 1 | 2 | 3 | 4 | 5 | 6 | 7 | 8 | 9 | 10 | 11 | 12 |
| 0 | 13 | 14 | 15 | 16 | 17 | 18 | 19 | 20 | 21 | 22 | 23 | 24 |
| 1 | 13 | 14 | 15 | 16 | 17 | 18 | 19 | 20 | 21 | 22 | 23 | 22 |
| 2 | 13 | 14 | 15 | 16 | 17 | 18 | 19 | 20 | 21 | 22 | 11 | 12 |
| 3 | 13 | 14 | 15 | 16 | 17 | 18 | 19 | 20 | 21 | 10 | 11 | 12 |
| 4 | 13 | 14 | 15 | 16 | 17 | 18 | 19 | 20 | 9 | 10 | 11 | 12 |
| 5 | 13 | 14 | 15 | 16 | 17 | 18 | 19 | 8 | 9 | 10 | 11 | 12 |
| 6 | 13 | 14 | 15 | 16 | 17 | 18 | 7 | 8 | 9 | 10 | 11 | 12 |
| 7 | 13 | 14 | 15 | 16 | 17 | 6 | 7 | 8 | 9 | 10 | 11 | 12 |
| 8 | 13 | 14 | 15 | 16 | 5 | 6 | 7 | 8 | 9 | 10 | 11 | 12 |
| 9 | 13 | 14 | 15 | 4 | 5 | 6 | 7 | 8 | 9 | 10 | 11 | 12 |
| 10 | 13 | 14 | 3 | 4 | 5 | 6 | 7 | 8 | 9 | 10 | 11 | 12 |
| 11 | 13 | 2 | 3 | 4 | 5 | 6 | 7 | 8 | 9 | 10 | 11 | 12 |
| 12 | 1 | 2 | 3 | 4 | 5 | 6 | 7 | 8 | 9 | 10 | 11 | 12 |

Referring to Table 1, the output order determining unit 220 may determine the output order according to the movement angles calculated by the movement angle calculating unit 212. In addition, the display 230 may display a natural 3D image despite the rightward movement of the gaze, by outputting the plurality of view images according to the determined output order. Here, when the movement angle is 0 in Table 1, the user is located in the middle of the display 230. When the movement angle is 12θ, both the left and the right eyes are moved to the sub-viewing zone. Therefore, the display 230 may display the output image comprised of 1 to 12-view images in that order.

The image processing apparatus 200 may enlarge a viewing angle twice as the gaze of the user is moved to the right. In this case, the output order determining unit 220 may determine the output order of the plurality of view images according to Table 2 below. The display 230 may display the plurality of view images according to the determined output order. Here, calculation of the movement angle according to the gaze movement is the same as described above regarding the movement angle calculating unit 212 and therefore will not be described again.

Table 2 shows the output orders of the view images, the output orders corresponding to the movement angles as the viewing angle increases. In Table 2, the input image is a 36-view image image.

TABLE 2

| Movement angle | Output orders of view images | | | | | | | | | | | |
|---|---|---|---|---|---|---|---|---|---|---|---|---|
| (θ) | 1 | 2 | 3 | 4 | 5 | 6 | 7 | 8 | 9 | 10 | 11 | 12 |
| 0 | 13 | 14 | 15 | 16 | 17 | 18 | 19 | 20 | 21 | 22 | 23 | 24 |
| 1 | 13 | 14 | 15 | 16 | 17 | 18 | 19 | 20 | 21 | 22 | 23 | 22 |
| 2 | 13 | 14 | 15 | 16 | 17 | 18 | 19 | 20 | 21 | 22 | 11 | 12 |
| 3 | 13 | 14 | 15 | 16 | 17 | 18 | 19 | 20 | 21 | 10 | 11 | 12 |
| 4 | 13 | 14 | 15 | 16 | 17 | 18 | 19 | 20 | 9 | 10 | 11 | 12 |
| 5 | 13 | 14 | 15 | 16 | 17 | 18 | 19 | 8 | 9 | 10 | 11 | 12 |
| 6 | 13 | 14 | 15 | 16 | 17 | 18 | 7 | 8 | 9 | 10 | 11 | 12 |
| 7 | 13 | 14 | 15 | 16 | 17 | 6 | 7 | 8 | 9 | 10 | 11 | 12 |
| 8 | 13 | 14 | 15 | 16 | 5 | 6 | 7 | 8 | 9 | 10 | 11 | 12 |
| 9 | 13 | 14 | 15 | 4 | 5 | 6 | 7 | 8 | 9 | 10 | 11 | 12 |
| 10 | 13 | 14 | 3 | 4 | 5 | 6 | 7 | 8 | 9 | 10 | 11 | 12 |
| 11 | 13 | 2 | 3 | 4 | 5 | 6 | 7 | 8 | 9 | 10 | 11 | 12 |
| 12 | 1 | 2 | 3 | 4 | 5 | 6 | 7 | 8 | 9 | 10 | 11 | 12 |
| 13 | 1 | 2 | 3 | 4 | 5 | 6 | 7 | 8 | 9 | 10 | 11 | 1 |

TABLE 2-continued

| Movement angle | Output orders of view images | | | | | | | | | | | |
|---|---|---|---|---|---|---|---|---|---|---|---|---|
| (θ) | 1 | 2 | 3 | 4 | 5 | 6 | 7 | 8 | 9 | 10 | 11 | 12 |
| 14 | 1 | 2 | 3 | 4 | 5 | 6 | 7 | 8 | 9 | 10 | 1 | 1 |
| 15 | 1 | 2 | 3 | 4 | 5 | 6 | 7 | 8 | 9 | 1 | 1 | 1 |
| 16 | 1 | 2 | 3 | 4 | 5 | 6 | 7 | 8 | 1 | 1 | 1 | 1 |
| 17 | 1 | 2 | 3 | 4 | 5 | 6 | 7 | 1 | 1 | 1 | 1 | 1 |
| 18 | 1 | 2 | 3 | 4 | 5 | 6 | 1 | 1 | 1 | 1 | 1 | 1 |
| 19 | 1 | 2 | 3 | 4 | 5 | 1 | 1 | 1 | 1 | 1 | 1 | 1 |
| 20 | 1 | 2 | 3 | 4 | 1 | 1 | 1 | 1 | 1 | 1 | 1 | 1 |
| 21 | 1 | 2 | 3 | 1 | 1 | 1 | 1 | 1 | 1 | 1 | 1 | 1 |
| 22 | 1 | 2 | 1 | 1 | 1 | 1 | 1 | 1 | 1 | 1 | 1 | 1 |
| 23 | 1 | 1 | 1 | 1 | 1 | 1 | 1 | 1 | 1 | 1 | 1 | 1 |

According to Table 2, when the gaze of the user is moved to the right, a wide viewing zone may be supplied without generating the inversion.

Table 3 shows the output orders of the view images, corresponding to the movement angles calculated according to a leftward movement of the gaze. In Table 3, the input image is a 36-view image.

TABLE 3

| Movement angle | Output orders of view images | | | | | | | | | | | |
|---|---|---|---|---|---|---|---|---|---|---|---|---|
| (θ) | 1 | 2 | 3 | 4 | 5 | 6 | 7 | 8 | 9 | 10 | 11 | 12 |
| 0 | 13 | 14 | 15 | 16 | 17 | 18 | 19 | 20 | 21 | 22 | 23 | 24 |
| 1 | 25 | 14 | 15 | 16 | 17 | 18 | 19 | 20 | 21 | 22 | 23 | 24 |
| 2 | 25 | 26 | 15 | 16 | 17 | 18 | 19 | 20 | 21 | 22 | 23 | 24 |
| 3 | 25 | 26 | 27 | 16 | 17 | 18 | 19 | 20 | 21 | 22 | 23 | 24 |
| 4 | 25 | 26 | 27 | 28 | 17 | 18 | 19 | 20 | 21 | 22 | 23 | 24 |
| 5 | 25 | 26 | 27 | 28 | 29 | 18 | 19 | 20 | 21 | 22 | 23 | 24 |
| 6 | 25 | 26 | 27 | 28 | 29 | 30 | 19 | 20 | 21 | 22 | 23 | 24 |
| 7 | 25 | 26 | 27 | 28 | 29 | 30 | 31 | 20 | 21 | 22 | 23 | 24 |
| 8 | 25 | 26 | 27 | 28 | 29 | 30 | 31 | 32 | 21 | 22 | 23 | 24 |
| 9 | 25 | 26 | 27 | 28 | 29 | 30 | 31 | 32 | 33 | 22 | 23 | 24 |
| 10 | 25 | 26 | 27 | 28 | 29 | 30 | 31 | 32 | 33 | 34 | 23 | 24 |
| 11 | 25 | 26 | 27 | 28 | 29 | 30 | 31 | 32 | 33 | 34 | 35 | 24 |
| 12 | 25 | 26 | 27 | 28 | 29 | 30 | 31 | 32 | 33 | 34 | 35 | 36 |

Referring to Table 3, when the movement angle is 12θ, both the left and the right eyes are disposed in the sub-viewing zone. Accordingly, the output order determining unit 220 may determine such that the view images constituting the output image are output in order of the 25 to 36-view images instead of in order of the 13 to 24-view images. That is, the display 230 may display the output image rendered with the 25 to 36-view images. Therefore, the output order determining unit 220 may determine the output order such that the user first sees the 13 to 24-view images in the middle of the display 230 and further sees up to the 36-view image while movement the gaze to the left. In other words, the viewing angle may be expanded to the left while preventing the inversion.

Referring to Table 3, in addition, the movement angle calculating unit 212 may calculate the movement angle according to leftward movement of the gaze. In addition, the output order determining unit 220 may determine the output order of the plurality of view images by referring to Table 2. Therefore, the display 230 outputs the plurality of view images according to the determined output order, thereby displaying a natural 3D image even though the gaze of the user is moved leftward.

Figure 8:
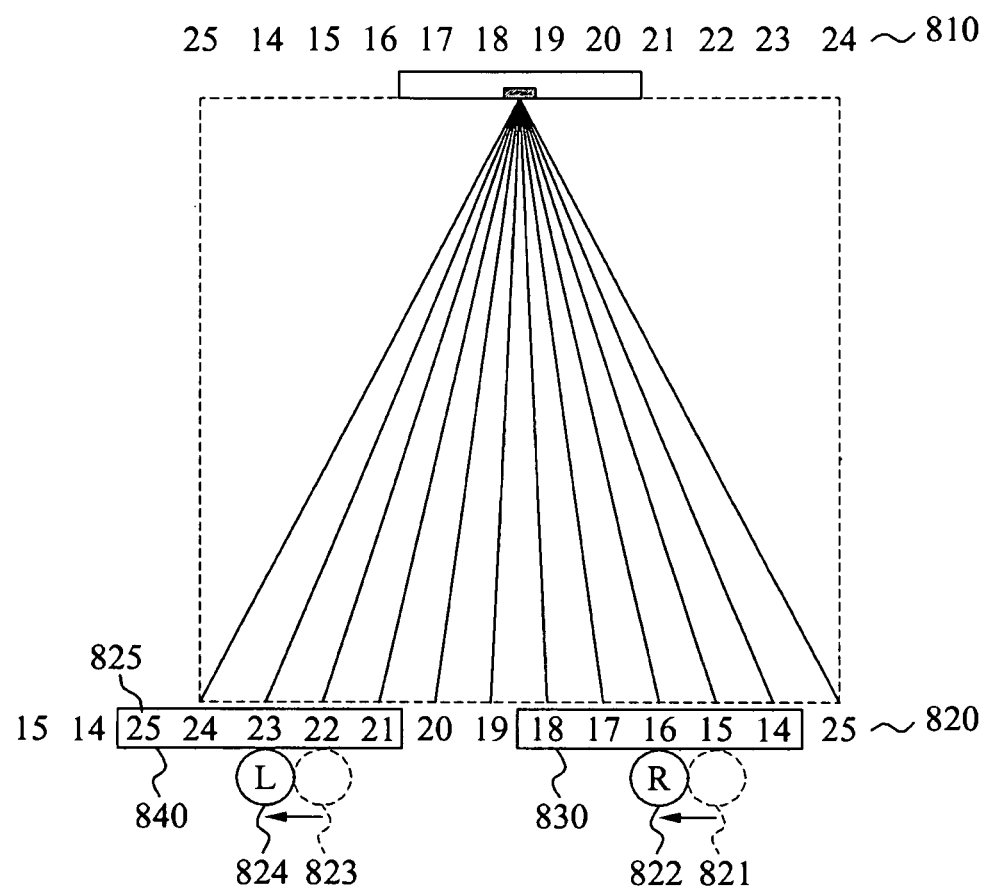
FIGS. 8 through 10 illustrate a process of determining an output order of view images when an input image is a 36-view image and a gaze of a user is moved to the left.

For example, in a state where the left eye gazes at a 22-view image 421 and the right eye gazes at a 15-view image 422 among the plurality of view images 410 as shown in FIG. 4, when the gaze is moved to the left by about θ, the output order determining unit 220 may adjust the output order of the view images 410 of FIG. 4 to an order of the 25, 14, 15, 16, 17, 18, 19, 20, 21, 22, 23, and 24-view images 810, as shown in FIG. 8. Accordingly, a 25-view image 825, as shown in FIG. 8, instead of the 13-view image is continued next to the 24-view image. Therefore, even though the gaze of the user is moved to the left by about 1θ, the left eye and the right eye of the user may see a natural 3D image. In particular, the output order determining unit 220 may determine the output order such that the same number of view images is continued to both the left and the right of a view image 824 corresponding to a position of the left eye. For example, the 25 and 24-view images may be continued to the left of the 23-view image while the 22 and 21-view images are continued to the right. Similarly, with respect to the 16-view image, the 18 and 17-view images may be continued to the left while the 15 and 14-view images are continued to the right. Thus, since the output order determining unit 220 determines the output order such that a left slide window 840 includes the left view images and a right slide window 830 includes the right view images, the natural 3D image may be implemented without discontinuity even if the user's eyes are minutely moved to the left and the right.

Figure 9:
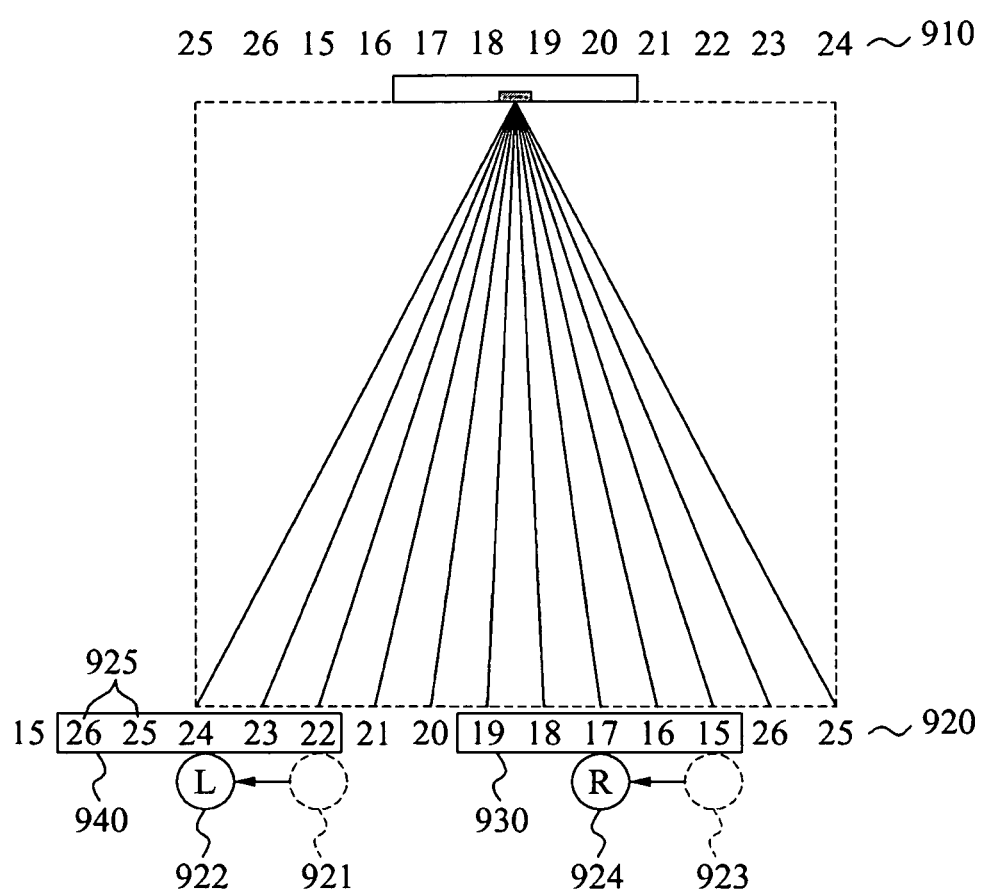

Similarly, as shown in FIG. 9, when the gaze of the user is moved to the left by about 2θ, the output order determining unit 220 may determine to output the view images in order of 25, 26, 15, 16, 17, 18, 19, 20, 21, 22, 23, and 24-view images 910, according to Table 3. As a result, the 26 and 25-view images 925 instead of the 14 and 13-view images may be continued next to the 24-view image.

Figure 10:
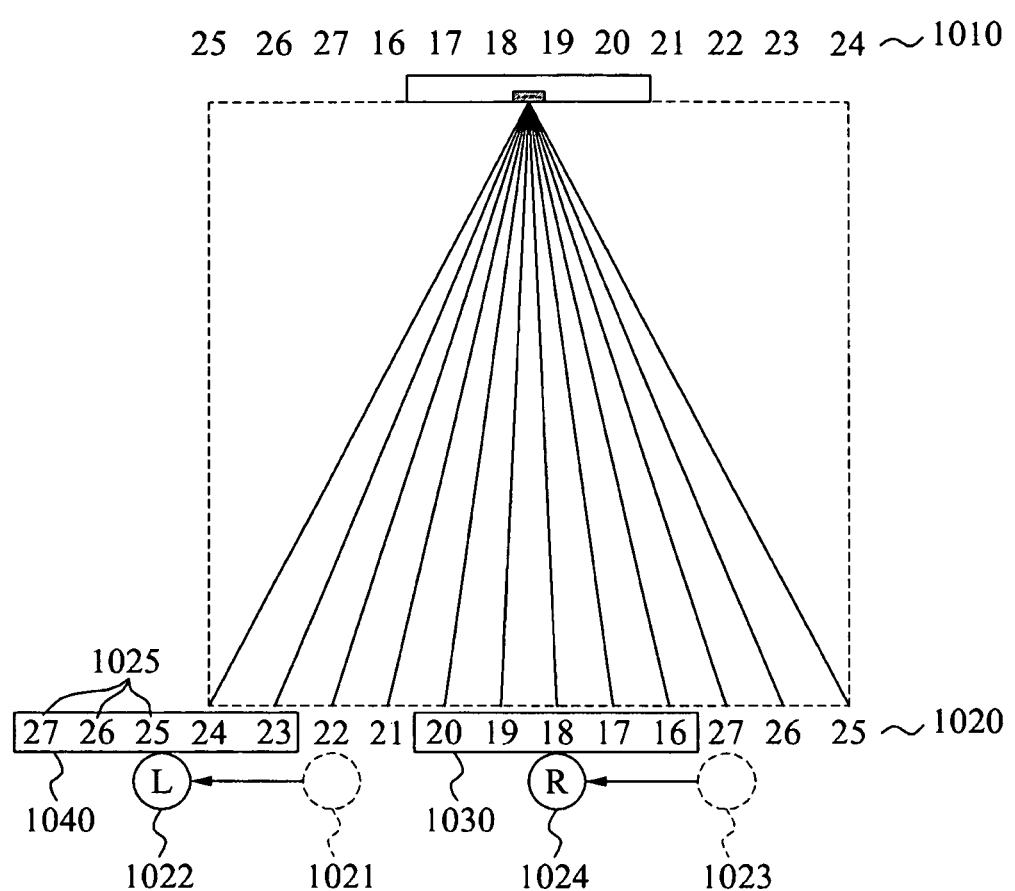

Also, as shown in FIG. 10, when the gaze of the user is moved to the left by about 3θ, the output order determining unit 220 may determine to output the view images in order of 25, 26, 27, 16, 17, 18, 19, 20, 21, 22, 23, 24-view images 1010, according to Table 3. As a result, the 15, 14, and 13-view images instead of 27, 26, and 25-view images 1025 may be continued next to the 24-view image.

A process of determining the output order of the view images corresponding to the gaze movement of the user when the input image is a 36-view image and the display is capable of displaying 12 view images was previously described with reference to FIGS. 4 through 10. Hereinafter, a process of determining the output order of the view images corresponding to the gaze movement of the user when the input image is a 12-view image and a display is capable of displaying 12 view images is described.

Figure 11:
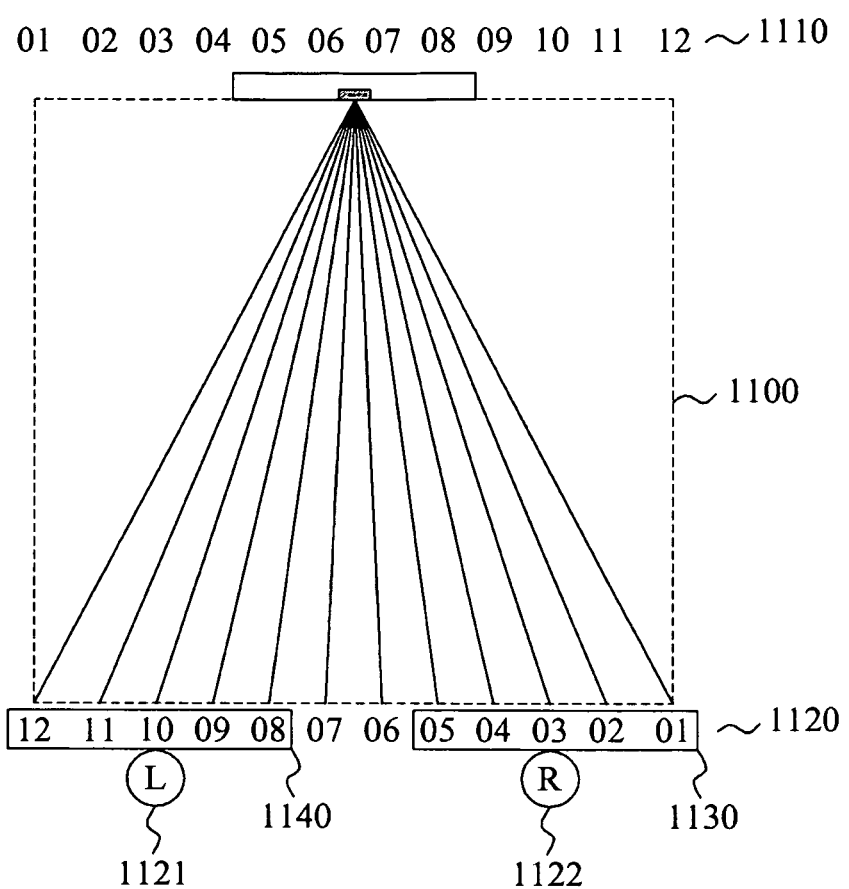
FIG. 11 is a diagram illustrating view images corresponding to a gaze of a user when an input image is a 12-view image and the user is located in a middle of a display.

FIG. 11 is a diagram illustrating view images corresponding to a gaze of a user when an input image is a 12-view image and the user is located in a middle of a display 1100. Here, the display 1100 that displays 12 view images and the input image comprised of 12 views are used.

Referring to FIG. 11, when the display 1100 includes a lens, the view images may be seen by the user in the opposite order of the input image owing to the characteristics of the lens. For example, when the view images are displayed in order from 1 to 12, the eyes of the user may see the view images in order from 12 to 1. When the user is located in the middle of the display 1100 in this state, the left eye of the user may be gazing at a 10-view image 1121 while the right eye may be gazing at a 3-view image 1122.

Figure 12:
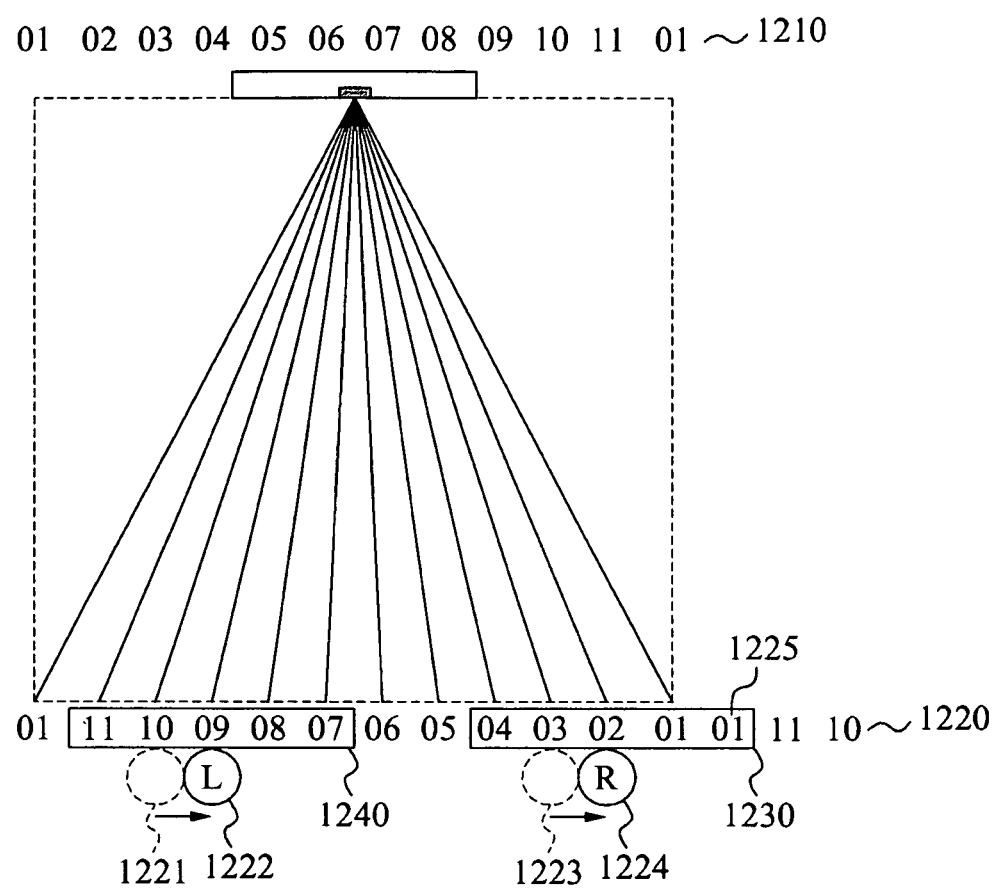
FIGS. 12 through 14 illustrate a process of determining an output order of view images when an input image is a 12-view image and a gaze of a user is moved to the right.

Here, as shown in FIG. 12, when the gaze of the user is moved to the right by about 1θ, the output order determining unit 220 may determine to output the view images in order of 01, 02, 03, 04, 05, 06, 07, 08, 09, 10, 11, and 01. Accordingly, the left eye may gaze at a 9-view image 1222 while the right eye gazes at a 02-view image 1224. In addition, a 01-view image 1225 instead of a 12-view image may be continued next to a 01-view image. Here, in the same manner as when the input image is the 36-view image, the plurality of view images of a right slide window 1230 are comprised of the right view images whereas the plurality of view images of a left slide window 1240 are comprised of the left view images. Sizes of the slide windows may be preset corresponding to the number of view images that can be simultaneously displayed in one pixel. Accordingly, the output image may include pixel units each including at least one view image.

Figure 13:
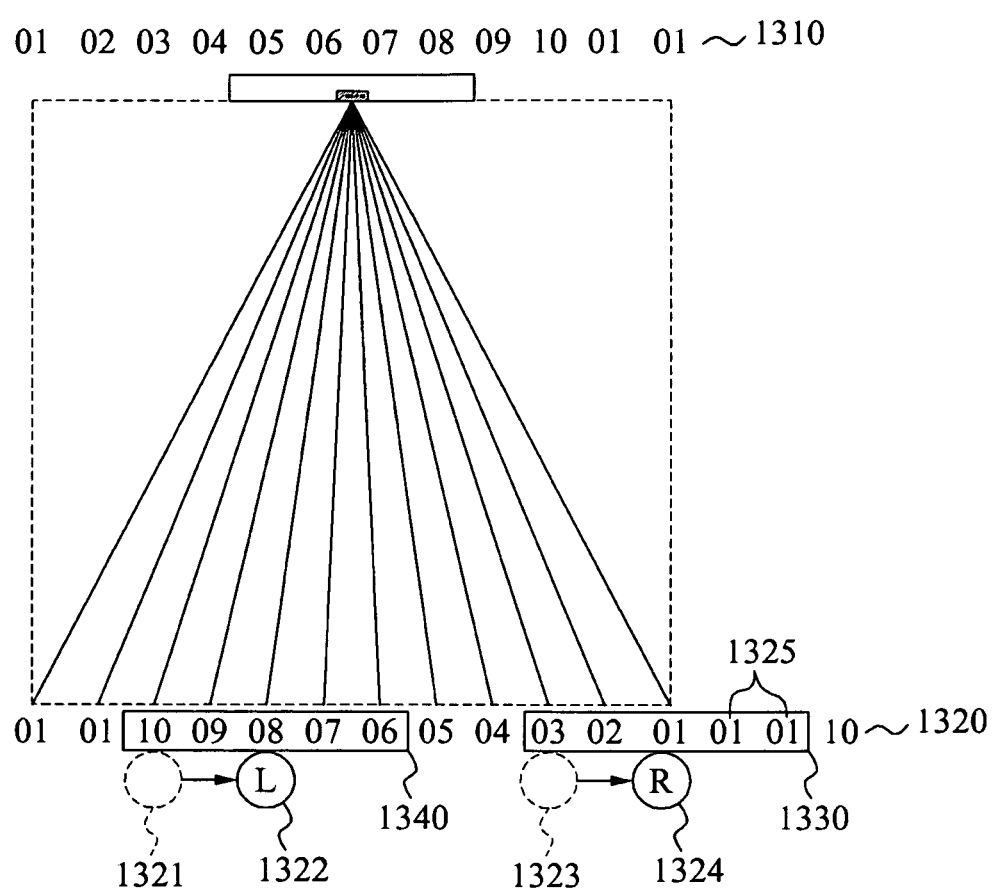

Similarly, when the gaze is moved by about 2θ as shown in FIG. 13, the output order determining unit 220 may determine to output the view images in order of 01, 02, 03, 04, 05, 06, 07, 08, 09, 10, 01, and 01-view images. Accordingly, the display 230 may display the view images 1310 according to the determined order. Therefore, even though the gaze of the user is moved to the right by about 3θ, the right eye may see 01 and 01-view images 1330 instead of 12 and 11-view images continuing after a 01-view image 1324. That is, the inversion may be prevented.

Figure 14:
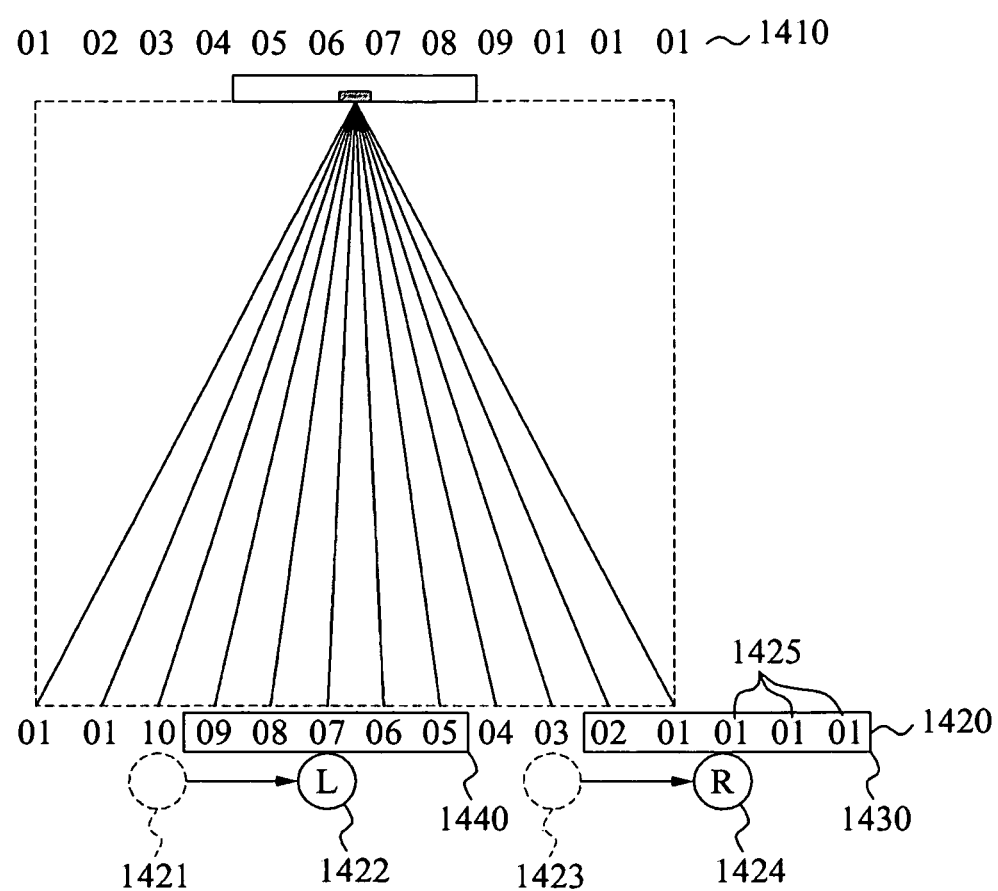

In the same manner, when the gaze is moved by about 3θ as shown in FIG. 14, the output order determining unit 220 may determine to output the view images in order of 01, 02, 03, 04, 05, 06, 07, 08, 09, 01, 01, and 01-view images. Accordingly, the display 230 may display the view images 1410 according to the determined order. Therefore, even though the gaze of the user is moved to the right by about 3θ, the right eye may see 01, 01, and 01-view images 1430 instead of 12, 11, and 10-view images continuing after a 01 view image 1424. That is, the inversion may be prevented.

Figure 15:
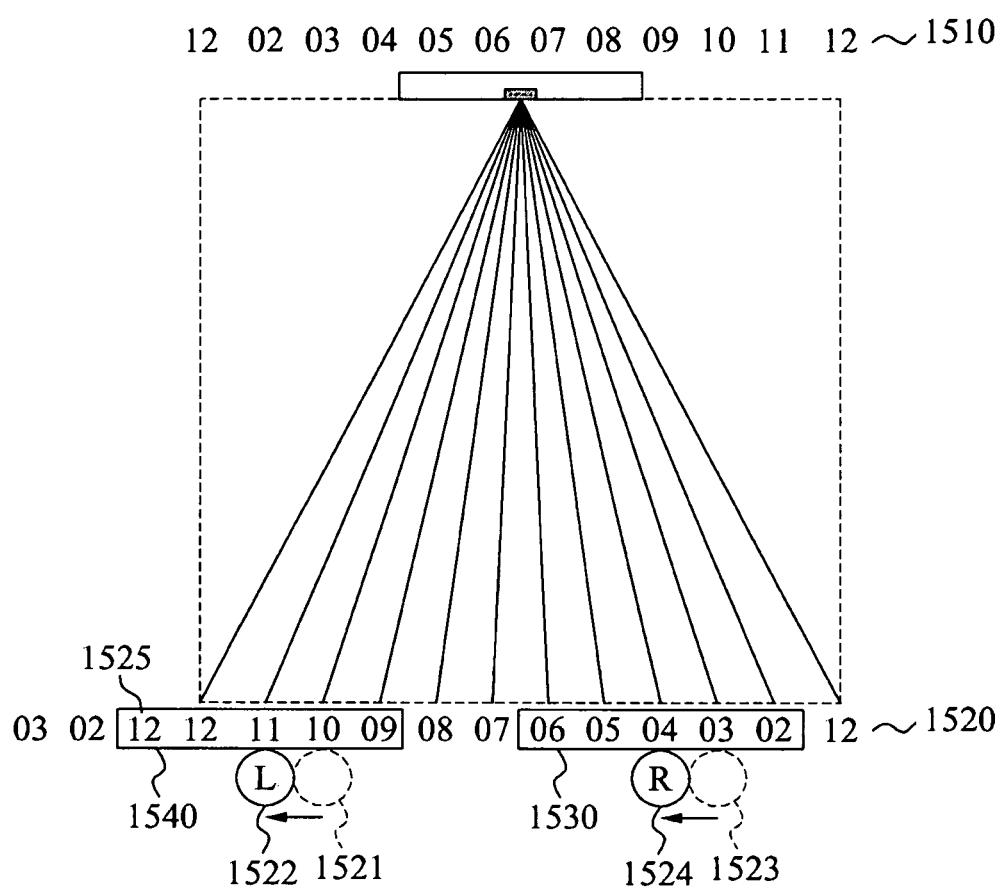
FIGS. 15 through 17 illustrate a process of determining an output order of view images when an input image is a 12-view image and a gaze of a user is moved to the left.
Figure 16:
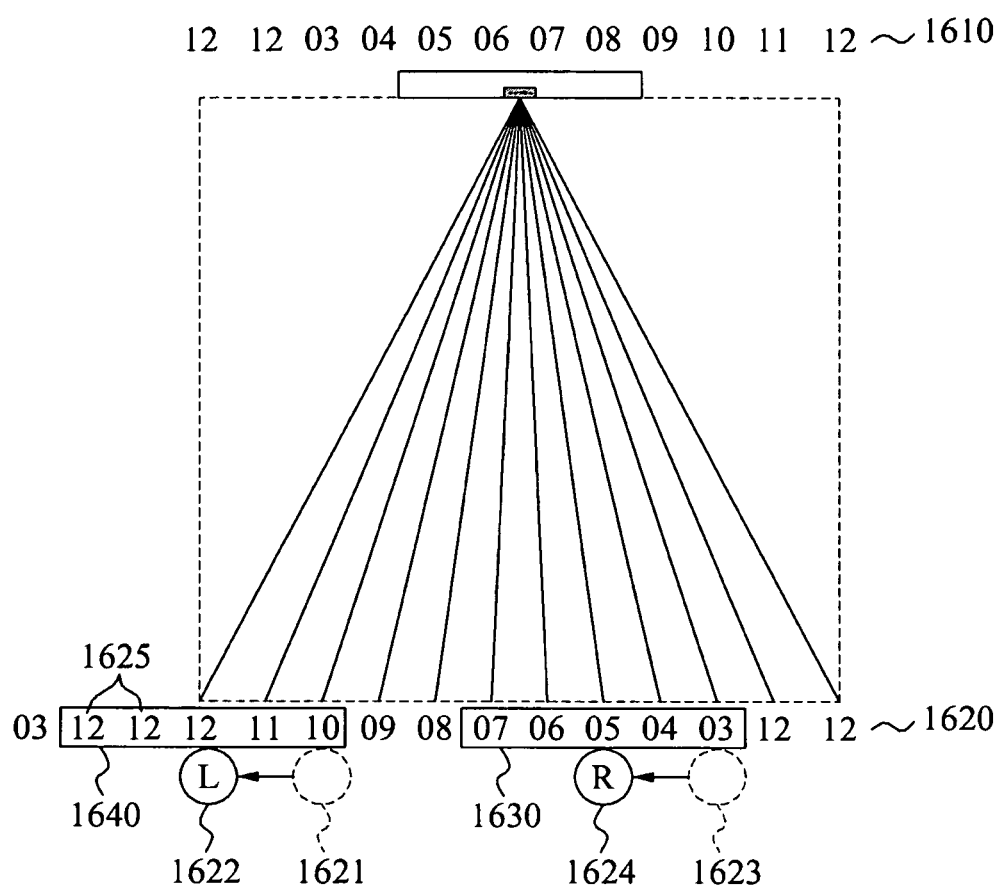
Figure 17:
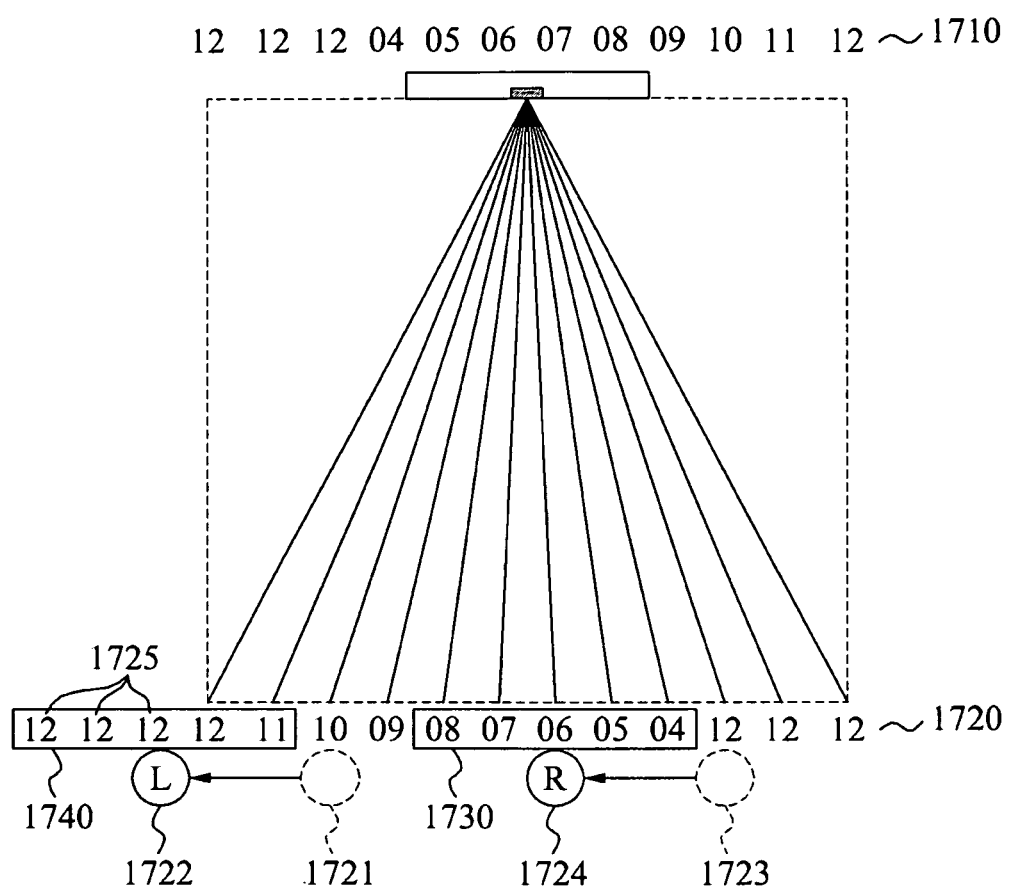

FIGS. 15 through 17 illustrate a process of determining an output order of view images when an input image is a 12-view image and a gaze of a user is moved to the left. In FIGS. 15 through 17, the input image is a 12-view image.

Referring to FIG. 15, when the gaze of the user is moved to the left by about 1θ, the output order determining unit 220 may determine to output the view images in order of 12, 02, 03, 04, 05, 06, 07, 08, 09, 10, 11, and 12-view images. Accordingly, the display 230 may display the view images 1510 according to the determined order. Therefore, even though the gaze is moved to the left by about 1θ, the left eye may see a 12-view image 1525 instead of a 01-view image continuing after another 12-view image. That is, the inversion may be prevented.

Similarly, when the gaze of the user is moved to the left by about 2θ as shown in FIG. 16, the output order determining unit 220 may determine to output the view images in order of 12, 12, 03, 04, 05, 06, 07, 08, 09, 10, 11, and 12-view images. Accordingly, the display 230 may display the view images 1610 according to the determined order. Therefore, even though the gaze is moved to the left by about 2θ, the left eye may see two instances of a 12-view image 1625 instead of 01 and 02-view images continuing after a 12-view image 1622. That is, the inversion may be prevented.

Similarly, when the gaze of the user is moved to the left by about 3θ as shown in FIG. 17, the output order determining unit 220 may determine to output the view images in order of 12, 12, 12, 04, 05, 06, 07, 08, 09, 10, 11, and 12-view images. Accordingly, the display 230 may display the view images 1710 according to the determined order. Therefore, even though the gaze is moved to the left by about 3θ, the left eye may see 12, 12, and 12-view images 1625 instead of 03, 02 and 01-view images continuing after a 12-view image. As a result, the inversion may be prevented. That is, a left slide window 1740 may include the 12, 12, and 12-view images 1725 which are the left view images instead of the 03, 02, and 01-view images which are the right view images.

The process of displaying a natural 3D image by slide windows that include different view images has been described above. Hereinafter, a process of selecting two view images from the plurality of view images constituting the input image and determining the output order of the view images using the selected view images is described. In this case, deterioration of a 3D image by a crosstalk may be prevented by performing rendering using the selected two view images in a position where 12-view images are to be displayed.

For example, the output order determining unit 220 may output order the output order of a plurality of the view images according to Table 4 below. The plurality of view images may include 2 view images.

Table 4 shows the output order of the view images, corresponding to the movement angle calculated as the gaze is moved to the right. In Table 4, the input image may be a 36-view image and a plurality of the displayed view images may include only 2 view images out of the 36 view images.

TABLE 4

| Movement angle (θ) | Output orders of view images | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 0 | 15 | 15 | 15 | 15 | 15 | 15 | 22 | 22 | 22 | 22 | 22 | 22 |
| 1 | 14 | 14 | 14 | 14 | 14 | 21 | 21 | 21 | 21 | 21 | 21 | 14 |
| 2 | 13 | 13 | 13 | 13 | 20 | 20 | 20 | 20 | 20 | 20 | 13 | 13 |
| 3 | 12 | 12 | 12 | 19 | 19 | 19 | 19 | 19 | 19 | 12 | 12 | 12 |
| 4 | 11 | 11 | 18 | 18 | 18 | 18 | 18 | 18 | 11 | 11 | 11 | 11 |
| 5 | 10 | 17 | 17 | 17 | 17 | 17 | 17 | 10 | 10 | 10 | 10 | 10 |
| 6 | 16 | 16 | 16 | 16 | 16 | 16 | 9 | 9 | 9 | 9 | 9 | 9 |
| 7 | 15 | 15 | 15 | 15 | 15 | 8 | 8 | 8 | 8 | 8 | 8 | 15 |
| 8 | 14 | 14 | 14 | 14 | 7 | 7 | 7 | 7 | 7 | 7 | 14 | 14 |
| 9 | 13 | 13 | 13 | 6 | 6 | 6 | 6 | 6 | 6 | 13 | 13 | 13 |
| 10 | 12 | 12 | 5 | 5 | 5 | 5 | 5 | 5 | 12 | 12 | 12 | 12 |
| 11 | 11 | 4 | 4 | 4 | 4 | 4 | 4 | 11 | 11 | 11 | 11 | 11 |
| 12 | 3 | 3 | 3 | 3 | 3 | 3 | 10 | 10 | 10 | 10 | 10 | 10 |
| 13 | 2 | 2 | 2 | 2 | 2 | 9 | 9 | 9 | 9 | 9 | 9 | 2 |
| 14 | 1 | 1 | 1 | 1 | 8 | 8 | 8 | 8 | 8 | 8 | 1 | 1 |
| 15 | 1 | 1 | 1 | 7 | 7 | 7 | 7 | 7 | 7 | 1 | 1 | 1 |
| 16 | 1 | 1 | 6 | 6 | 6 | 6 | 6 | 6 | 1 | 1 | 1 | 1 |
| 17 | 1 | 5 | 5 | 5 | 5 | 5 | 5 | 1 | 1 | 1 | 1 | 1 |
| 18 | 4 | 4 | 4 | 4 | 4 | 4 | 1 | 1 | 1 | 1 | 1 | 1 |
| 19 | 3 | 3 | 3 | 3 | 3 | 1 | 1 | 1 | 1 | 1 | 1 | 3 |
| 20 | 2 | 2 | 2 | 2 | 1 | 1 | 1 | 1 | 1 | 1 | 2 | 2 |
| 21 | 1 | 1 | 1 | 1 | 1 | 1 | 1 | 1 | 1 | 1 | 1 | 1 |

According to Table 4, when the gaze of the user is moved to the right and the calculated movement angle is about 12θ, both the left and the right eyes may be disposed in the sub-viewing zone. Accordingly, the display 230 may display an output image comprised of a 3-view image and a 10-view image. As the output order determining unit 220 determines the output order referring to FIG. 4, the user located in the middle of the display may first see 15 and 22-view images and further see up to a 1-view image while moving the gaze to the right.

Figure 18:
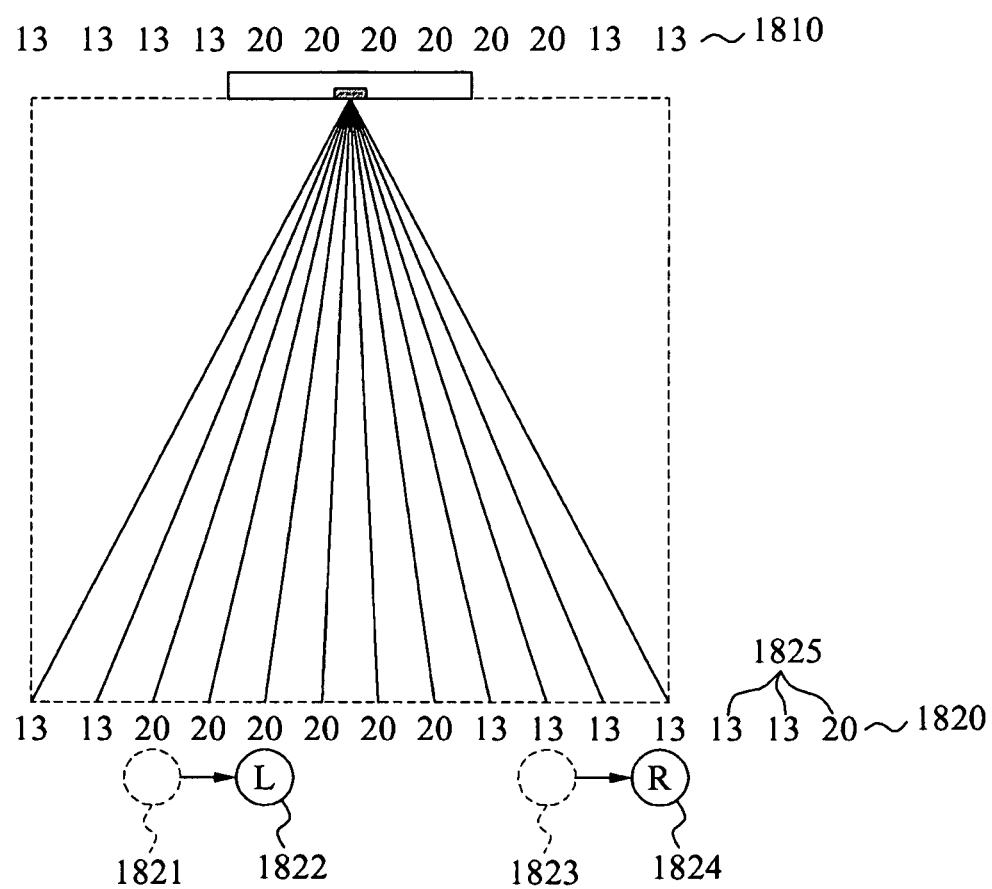
FIG. 18 illustrates a process of determining an output order of view images using only 2 view images when an input image is a 36-view image and a gaze of a user is moved to the right.

For example, when the gaze of the user is moved to the right by about 2θ as shown in FIG. 18, the output order determining unit 220 may determine, based on Table 4, to output the view images in order of 13, 13, 13, 13, 20, 20, 20, 20, 20, 20, 13, and 13-view images 1810. Therefore, even though the gaze is moved to the right by about 2θ, respectively two 13-view images may be continued both to the left and the right of a 13-view image 1824 which corresponds to a position to which the gaze is moved. In other words, the right eye may see the view images in order of 13, 13, 13, 13, and 13-view images instead of 13, 13, 13, 11, and 12-view images.

Table 5 shows the output order of the view images, corresponding to the movement angle calculated as the gaze is moved to the left. In Table 5, the input image may be a 36-view image and a plurality of the displayed view images may include only 2 view images out of the 36 view images.

TABLE 5

| Movement angle (θ) | Output orders of view images | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 0 | 15 | 15 | 15 | 15 | 15 | 15 | 22 | 22 | 22 | 22 | 22 | 22 |
| 1 | 23 | 16 | 16 | 16 | 16 | 16 | 16 | 23 | 23 | 23 | 23 | 23 |
| 2 | 24 | 24 | 17 | 17 | 17 | 17 | 17 | 17 | 24 | 24 | 24 | 24 |
| 3 | 25 | 25 | 25 | 18 | 18 | 18 | 18 | 18 | 18 | 25 | 25 | 25 |
| 4 | 26 | 26 | 26 | 26 | 19 | 19 | 19 | 19 | 19 | 19 | 26 | 26 |
| 5 | 27 | 27 | 27 | 27 | 27 | 20 | 20 | 20 | 20 | 20 | 20 | 27 |
| 6 | 28 | 28 | 28 | 28 | 28 | 28 | 21 | 21 | 21 | 21 | 21 | 21 |
| 7 | 22 | 29 | 29 | 29 | 29 | 29 | 29 | 22 | 22 | 22 | 22 | 22 |
| 8 | 23 | 23 | 30 | 30 | 30 | 30 | 30 | 30 | 23 | 23 | 23 | 23 |
| 9 | 24 | 24 | 24 | 31 | 31 | 31 | 31 | 31 | 31 | 24 | 24 | 24 |
| 10 | 25 | 25 | 25 | 25 | 32 | 32 | 32 | 32 | 32 | 32 | 25 | 25 |
| 11 | 26 | 26 | 26 | 26 | 26 | 33 | 33 | 33 | 33 | 33 | 33 | 26 |
| 12 | 27 | 27 | 27 | 27 | 27 | 27 | 34 | 34 | 34 | 34 | 34 | 34 |
| 13 | 35 | 28 | 28 | 28 | 28 | 28 | 28 | 35 | 35 | 35 | 35 | 35 |
| 14 | 36 | 36 | 29 | 29 | 29 | 29 | 29 | 29 | 36 | 36 | 36 | 36 |
| 15 | 36 | 36 | 36 | 30 | 30 | 30 | 30 | 30 | 30 | 36 | 36 | 36 |
| 16 | 36 | 36 | 36 | 36 | 31 | 31 | 31 | 31 | 31 | 36 | 36 | 36 |
| 17 | 36 | 36 | 36 | 36 | 36 | 32 | 32 | 32 | 32 | 32 | 32 | 36 |
| 18 | 36 | 36 | 36 | 36 | 36 | 36 | 33 | 33 | 33 | 33 | 33 | 33 |
| 19 | 34 | 36 | 36 | 36 | 36 | 36 | 36 | 34 | 34 | 34 | 34 | 34 |
| 20 | 35 | 35 | 36 | 36 | 36 | 36 | 36 | 36 | 35 | 35 | 35 | 35 |
| 21 | 36 | 36 | 36 | 36 | 36 | 36 | 36 | 36 | 36 | 36 | 36 | 36 |

Referring to Table 5, when the gaze is moved to the left and the calculated movement angle is about 12θ, both the left and the right eyes may be disposed in the sub-viewing zone. Accordingly, the display 230 may display an output image comprised of a 27-view image and a 34-view image. As the output order determining unit 220 determines the output order referring to FIG. 5, the user located in the middle of the display may first see 15 and 22-view images and further see up to a 36-view image while moving the gaze to the left. In other words, the image processing apparatus 200 enlarges the viewing angle twice to the left of the user, thereby supplying a natural 3D image without causing the inversion.

Figure 19:
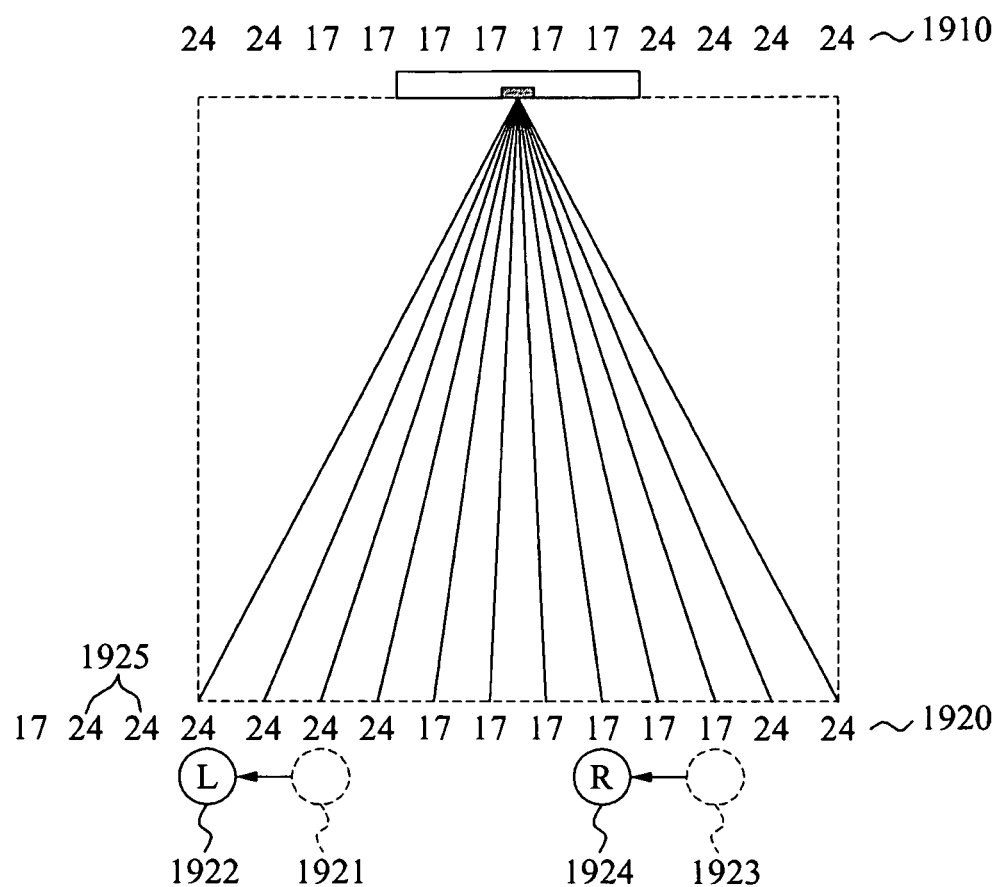
FIG. 19 illustrates a process of determining an output order of view images using only 2 view images when an input image is a 36-view image and a gaze of a user is moved to the left.

For example, when the gaze of the user is moved to the left by about 2θ as shown in FIG. 19, the output order determining unit 220 may determine according to Table 5 to output the view images in order of 24, 24, 17, 17, 17, 17, 17, 17, 24, 24, 24, and 24-view images 1910. Therefore, even though the gaze is moved to the right by about 2θ, respectively two 24-view images may be continued both to the left and the right of a 24-view image 1922 which corresponds to a position to which the gaze is moved. In other words, the left eye may see the view images in order of 24, 24, 24 (1922), 24, and 24-view images.

In the same manner, when the input image is a 12-view image and when the gaze is moved to the right, the output order determining unit 220 may determine the output order corresponding to the movement angle according to Table 6 below. Here, when the gaze is moved to the left, the output order determining unit 220 may determine the output order of the view image corresponding to the movement angle as shown in Table 6 below.

Table 6 shows the output order of the view images, corresponding to the movement angle calculated as the gaze is moved to the right. In FIG. 6, the input image may be a 12-view image and the plurality of displayed view images may include only 2 view images out of the 12 view images.

TABLE 6

| Movement angle (θ) | Output orders of view images | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 0 | 3 | 3 | 3 | 3 | 3 | 3 | 10 | 10 | 10 | 10 | 10 | 10 |
| 1 | 2 | 2 | 2 | 2 | 2 | 9 | 9 | 9 | 9 | 9 | 9 | 2 |
| 2 | 1 | 1 | 1 | 1 | 8 | 8 | 8 | 8 | 8 | 1 | 1 | 1 |
| 3 | 1 | 1 | 1 | 7 | 7 | 7 | 7 | 7 | 7 | 1 | 1 | 1 |
| 4 | 1 | 1 | 6 | 6 | 6 | 6 | 6 | 6 | 1 | 1 | 1 | 1 |
| 5 | 1 | 5 | 5 | 5 | 5 | 5 | 5 | 1 | 1 | 1 | 1 | 1 |
| 6 | 4 | 4 | 4 | 4 | 4 | 4 | 1 | 1 | 1 | 1 | 1 | 1 |
| 7 | 3 | 3 | 3 | 3 | 3 | 1 | 1 | 1 | 1 | 1 | 1 | 3 |
| 8 | 2 | 2 | 2 | 2 | 1 | 1 | 1 | 1 | 1 | 1 | 2 | 2 |
| 9 | 1 | 1 | 1 | 1 | 1 | 1 | 1 | 1 | 1 | 1 | 1 | 1 |

Referring to Table 6, when the input image is the 12-view image and the movement angle becomes about 9θ, the left eye and the right eye both see a 1-view image, that is, a 2D image is seen by the user. However, although the display 230 displays an output image comprised of twelve 1-view images, the output image is seen as a 3D image by the user due to motion parallax.

Figure 20:
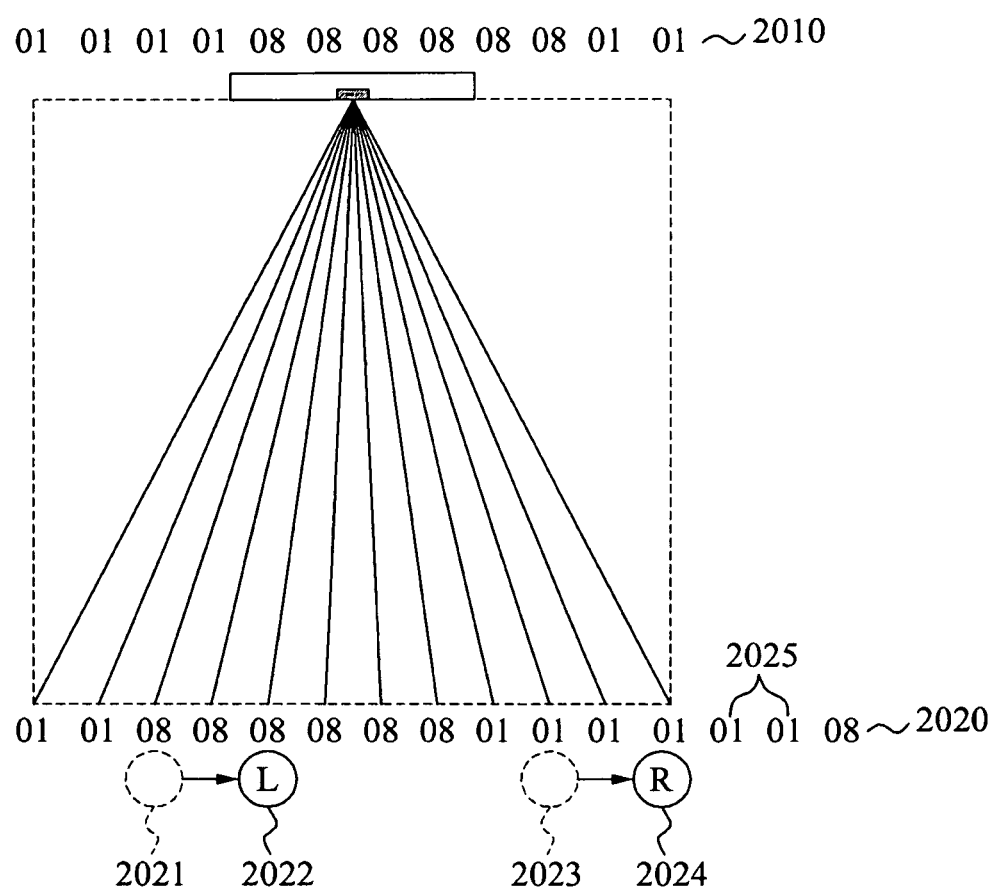
FIG. 20 illustrates a process of determining an output order of view images using only 2 view images when an input image is a 12-view image and a gaze of a user is moved to the right.

For example, when the gaze is moved to the right by about 2θ as shown in FIG. 20, the output order determining unit 220 may determine to output the view images in order of 01, 01, 01, 01, 08, 08, 08, 08, 08, 08, 01, and 01-view images 2010. Therefore, even though the gaze is moved to the right by about 2θ, respectively two 01-view images may be continued both to the left and the right of a 01-view image 2024 which corresponds to a position to which the gaze is moved. In other words, the right eye may see the view images in order of 01, 01, 01 corresponding to 01 2024, 01, and 01-view images. In other words, in a display that displays 12 view images, the 01 and 01-view images may be rendered in a 11$^{th}$ and 12$^{th}$ position 2025.

Table 7 shows the output order corresponding to the movement angle calculated as the gaze is moved to the left. In FIG. 7, the input image is a 12-view image and a plurality of the displayed view images may include only 2 view images out of the 12 view images.

TABLE 7

| Movement angle (θ) | Output orders of view images | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 0 | 3 | 3 | 3 | 3 | 3 | 3 | 10 | 10 | 10 | 10 | 10 | 10 |
| 1 | 11 | 4 | 4 | 4 | 4 | 4 | 4 | 11 | 11 | 11 | 11 | 11 |
| 2 | 12 | 12 | 5 | 5 | 5 | 5 | 5 | 5 | 12 | 12 | 12 | 12 |
| 3 | 12 | 12 | 12 | 6 | 6 | 6 | 6 | 6 | 6 | 12 | 12 | 12 |
| 4 | 12 | 12 | 12 | 12 | 7 | 7 | 7 | 7 | 7 | 7 | 12 | 12 |
| 5 | 12 | 12 | 12 | 12 | 12 | 8 | 8 | 8 | 8 | 8 | 8 | 12 |
| 6 | 12 | 12 | 12 | 12 | 12 | 12 | 9 | 9 | 9 | 9 | 9 | 9 |
| 7 | 10 | 12 | 12 | 12 | 12 | 12 | 12 | 10 | 10 | 10 | 10 | 10 |
| 8 | 11 | 11 | 12 | 12 | 12 | 12 | 12 | 12 | 11 | 11 | 11 | 11 |
| 9 | 12 | 12 | 12 | 12 | 12 | 12 | 12 | 12 | 12 | 12 | 12 | 12 |

Referring to Table 7, since the input image is the 12-view image, when the movement angle is about 9θ, the left and the right eyes both see only the 12-view image, that is, a 2D image is seen by the user. However, although the display 230 displays an output image comprised of twelve 12-view images, the output image is seen as a 3D image by the user due to motion parallax.

Figure 21:
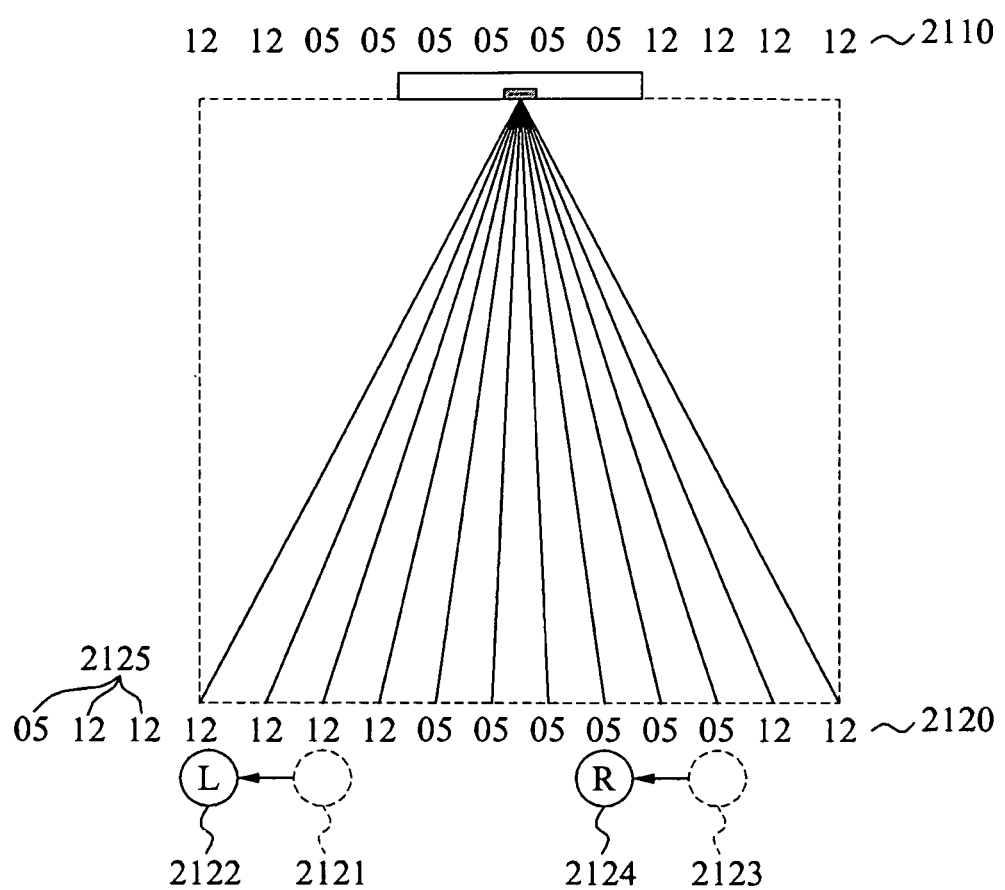
FIG. 21 illustrates a process of determining an output order of view images using only 2 view images when an input image is a 12-view image and a gaze of a user is moved to the left.

For example, when the gaze is moved to the left by about 2θ as shown in FIG. 21, the output order determining unit 220 may determine to output the view images in order of 12, 12, 05, 05, 05, 05, 05, 05, 12, 12, 12, and 12-view images 2110 according to FIG. 21. Therefore, even though the gaze is moved to the left by about 2θ, respectively two 12-view images may be continued to the left and the right of a 12-view image 2122 which corresponds to a position to which the gaze is moved. In other words, the left eye sees the view images in order of 12, 12, 12(2122), 12, and 12-view images. That is, in a display that displays the 12 view images, the 12 and 12-view images may be rendered in a first and second position 2125.

Tables 1 through 7 above may be stored in the image processing apparatus 200 in the form of a database. Accordingly, the output order determining unit 220 may determine the output order of the view images corresponding to the movement angle calculated by the movement angle calculating unit 212, by referring to the table database.

Figure 22:
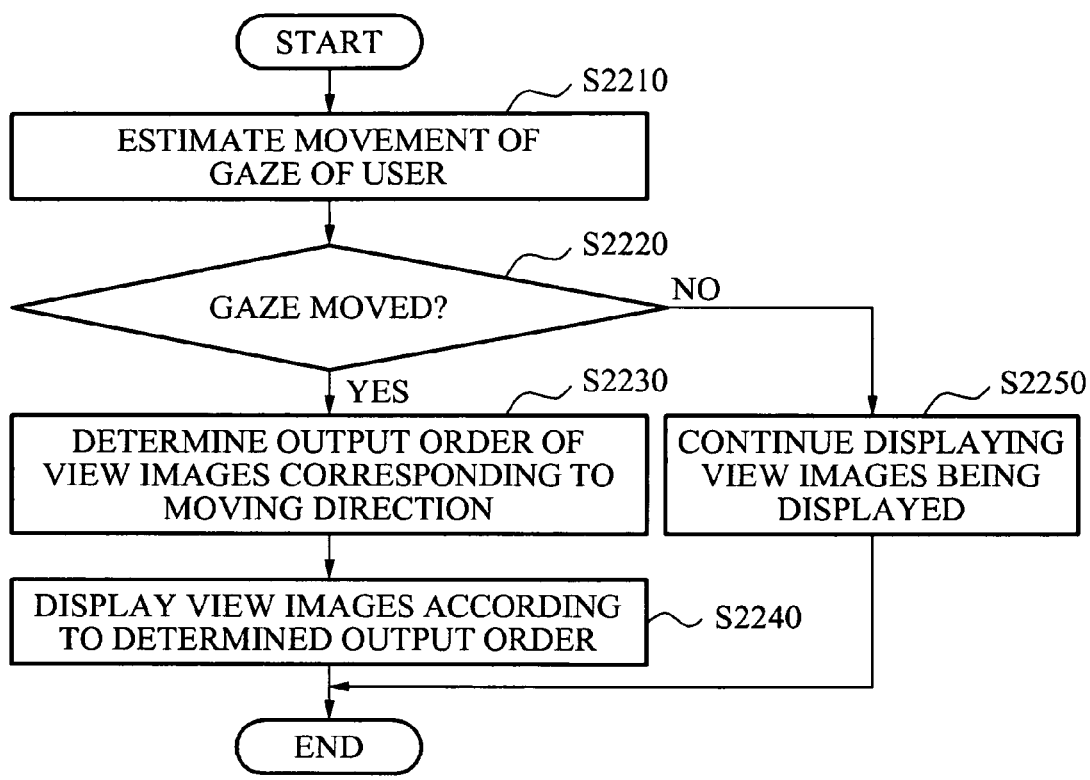
FIG. 22 is a flowchart for describing a process of determining an output order of view images according to movement of a gaze of a user.

FIG. 22 is a flowchart describing a process of determining an output order of view images according to the movement of a user's gaze.

Referring to FIG. 22, the movement estimation unit 210 may estimate whether the gaze of the user is moved in operation S2210.

For example, the sensing device 100 may photograph the user in real time and transmit the photographed image to the movement distance calculating unit 211 in real time. Accordingly, the movement distance calculating unit 211 may calculate positions of the left eye and the right eye of the user from the photographed image, and calculate next positions of the left or the right eye or of both eyes from a next photographed image. Here, the left and right eye positions may be expressed as coordinate values. The movement distance calculating unit 211 may calculate difference values between current and next left eye positions and between current and next right eye positions calculated from the current and the next photographed images, thereby calculating the left difference value and the right difference value.

The movement distance calculating unit 211 may estimate whether the gaze is moved using the left and the right difference values, in operation S2220.

For example, when any of the left difference value and the right difference value is equal to or greater than the preset error value, the movement distance calculating unit 211 may estimate that the gaze is moved ("YES" branch of operation S2220). In addition, when the left and the right difference values are positive, the movement distance calculating unit 211 may estimate that the gaze is moved to the right. When the left and right difference values are negative, the movement distance calculating unit 211 may estimate that the gaze is moved to the left. The movement distance x may be expressed as a coordinate value comprised of the left and the right difference values.

The movement angle calculating unit 212 may calculate the movement angle of the eye of the user, corresponding to the gaze movement of the user, using the movement distance x and a focal distance fl. For example, the movement angle calculating unit 212 may calculate the movement angle using Equation 1 described above.

Next, when the gaze of the user is moved, the output order determining unit 220 may determine the output order of the view images corresponding to a movement direction of the gaze, in operation S2230.

For example, the output order determining unit 220 may determine the output order of the view images corresponding to the movement angle calculated with reference to Tables 1 through 7. More specifically, the output order may be determined based on the input image and the movement direction of the gaze. That is, the output order of the view images corresponding to the movement angles may be determined according to whether the input image is a 12-view image or a 36-view image and whether the gaze of the user is moved to the right or the left.

That is, the output order determining unit 220 may determine the output order of the view images corresponding to the left eye of the user when the gaze of the user is moved to the right. When the gaze is moved to the left, the output order determining unit 220 may adjust the output order of the view images corresponding to the left eye. Here, the output order may be adjusted such that the left slide window and the right slide window include respectively different view images consecutively arranged.

Sizes of the left and the right slide windows may be preset corresponding to the number of view images that can be simultaneously displayed in one pixel. Left and right view images of a view image corresponding to a position to which the gaze is moved may be respectively disposed in the middle of the left and the right slide windows. In addition, a reference number of view images may be continued to the left and the right of the view images disposed in the middle. Here, the reference number may be preset as a value obtained by dividing the number of view images simultaneously displayed in one pixel by 2. Thus, by the left and the right slide windows, the natural 3D image may be seen by the user even if the user's eyes are minutely moved to the left and the right.

Next, the display 230 may display a plurality of view images according to the determined output order in operation S2240. That is, the display 230 may display the output image comprised of a plurality of different view images. Here, the output image may include pixel units each including at least one view image. Therefore, even when the gaze of the user is moved to the left or the right, the left eye of the user sees only the left view images and the right eye sees only the right view images.

As another example, the output order determining unit 220 may adjust the output order using only 2 view images out of the plurality of view images. In this case, the display 230 may display the view image comprised of the two view images according to the adjusted output order.

When the gaze is estimated as not having been moved in operation S2210 ("NO" branch of operation S2220), the display 230 may continuously display the output image according to the order of the view images being displayed in operation S2250.

The display 230 described above may include a lens structure such as a lenticular lens or a barrier structure.

The methods according to the above-described example embodiments may be recorded in non-transitory computer-readable media or processor-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts.

Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. The methods may be executed on a general purpose computer or processor or may be executed on a particular machine such as the image processing apparatus described herein. Any one or more of the software modules described herein may be executed by a dedicated processor unique to that unit or by a processor common to one or more of the modules.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. An image processing apparatus comprising:
a processor configured to control one or more processor-executable units;
a movement estimation unit configured to estimate a movement of an eye position of a user; and
an output order determining unit configured to determine an output order of a plurality of view images corresponding to the movement of the eye position of the user,
wherein the output order determining unit determines the output order of the plurality of view images such that a predetermined number of left and right view images are consecutively arranged with respect to a reference view image and that a view image next to an outermost view image of the plurality of view images which cause an inversion within the predetermined number of left and right view images is replaced with the outermost view image, the inversion including a continuous arrangement of a leftmost view image and a rightmost view image, wherein the reference view image corresponds to a position to which the eye position of the user is moved, and wherein the predetermined number is calculated based on the number of view images that can be simultaneously displayed in one pixel.

2. The image processing apparatus of claim 1, wherein:
the movement estimation unit estimates a movement direction of the eye position of the user; and
the output order determining unit adjusts the output order of the plurality of view images corresponding to a right eye of the user when the eye position of the user is moved to the right.

3. The image processing apparatus of claim 1, wherein:
the movement estimation unit estimates a movement direction of the eye position of the user; and
the output order determining unit adjusts the output order of the plurality of view images corresponding to a left eye of the user when the eye position of the user is moved to the left.

4. The image processing apparatus of claim 1, wherein:
the movement estimation unit estimates a movement angle of the eye position of the user using the movement of the eye position of the user and a focal distance; and
the output order determining unit varies the number of the plurality of view images of which the output order is to be adjusted, based on the movement angle.

5. The image processing apparatus of claim 4, wherein, as the movement angle increases, the output order determining unit increases the number of the plurality of view images for which the output order is to be adjusted.

6. The image processing apparatus of claim 1, further comprising a display configured to display an output image comprising a plurality of the view images, according to the determined output order.

7. The image processing apparatus of claim 6, wherein the output image comprises pixel units each containing at least one view image.

8. An image processing method comprising:
estimating a movement of an eye position of a user; and
determining, by way of a processor, an output order of a plurality of view images corresponding to the movement of the eye position of the user,
wherein the determining of the output order determines the output order of the plurality of view images such that a predetermined number of left and right view images are consecutively arranged with respect to a reference view image and that a view image next to an outermost view image of the plurality of view images which cause an inversion within the predetermined number of left and right view images is replaced with the outermost view image, the inversion including a continuous arrangement of a leftmost view image and a rightmost view image, wherein the reference view image corresponds to a position to which the eye position of the user is moved, and wherein the predetermined number is calculated based on the number of view images that can be simultaneously displayed in one pixel.

9. The image processing method of claim 8, wherein:
the estimating of the movement of the eye position estimates a movement direction of the eye position of the user; and
the determining of the output order adjusts an output order of the plurality of view images corresponding to a right eye of the user when the eye position of the user is moved to the right.

10. The image processing method of claim 8, wherein:
the estimating of the movement of the eye position estimates a movement direction of the eye position of the user; and
the determining of the output order adjusts an output order of the plurality of view images corresponding to a left eye of the user when the eye position of the user is moved to the left.

11. The image processing method of claim 8, wherein:
the estimating of the movement of the eye position estimates a movement angle of the eye position of the user using the movement of the eye position of the user and a local distance; and
the determining of the output order varies the number of the plurality of view images of which the output order is to be adjusted, according to the movement angle.

12. The image processing method of claim 11, wherein the determining of the output order increases the number of the plurality of view images of which the output order is to be adjusted as the movement angle increases.

13. The image processing method of claim 9, further comprising displaying an output image comprising a plurality of the view images according to the determined output order.

14. The image processing method of claim 13, wherein the output image comprises pixel units each comprising at least one view image.

15. A non-transitory computer readable recording medium storing a program to cause a computer to implement the method of claim 8.

16. A method of adjusting a multi-view image in a multi-view display, the method comprising:
detecting movement of an eye position of a user; and
reordering, by way of a processor, an output order of a plurality of view images making up the multi-view image in accordance with the detected movement of the eye position,
wherein the reordering of the output order reorders the output order of the plurality of view images such that a predetermined number of left and right view images are consecutively arranged with respect to a reference view image and that a view image next to an outermost view image of the plurality of view images which cause an inversion within the predetermined number of left and right view images is replaced with the outermost view image, the inversion including a continuous arrangement of a leftmost view image and a rightmost view image, wherein the reference view image corresponds to a position to which the eye position of the user is moved, and wherein the predetermined number is calculated based on the number of view images that can be simultaneously displayed in one pixel.

17. A non-transitory computer readable recording medium storing a program to cause a computer to implement the method of claim 16.

18. A multi-view image display apparatus displaying a multi-view image, the apparatus comprising:
a processor configured to control one or more processor-executable units;
a movement estimation unit configured to estimate a movement of an eye position of a user; and
an output order determining unit configured to change an output order of a plurality of view images making up the multi-view image in accordance with the movement of the eye position estimated by the movement estimation unit,
wherein the output order determining unit changes the output order of the plurality of view images such that determines the output order of the plurality of view images such that a predetermined number of left and right view images are consecutively arranged with respect to a reference view image and that a view image next to an outermost view image of the plurality of view images which cause an inversion within the predetermined number of left and right view images is replaced with the outermost view image, the inversion including a continuous arrangement of a leftmost view image and a rightmost view image, wherein the reference view image corresponds to a position to which the eye position of the user is moved, and wherein the predetermined number is calculated based on the number of view images that can be simultaneously displayed in one pixel.

* * * * *